United States Patent
Fukuzawa et al.

(10) Patent No.: US 12,523,610 B2
(45) Date of Patent: Jan. 13, 2026

(54) ANALYSIS DEVICE, ANALYSIS SYSTEM AND PORTABLE INFORMATION TERMINAL

(71) Applicant: TDK CORPORATION, Tokyo (JP)

(72) Inventors: Hideaki Fukuzawa, Tokyo (JP); Tomohito Mizuno, Tokyo (JP); Tetsuya Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 150 days.

(21) Appl. No.: 18/133,261

(22) Filed: Apr. 11, 2023

(65) Prior Publication Data
US 2023/0333022 A1    Oct. 19, 2023

(30) Foreign Application Priority Data

Apr. 19, 2022 (JP) ................................. 2022-068883
Nov. 11, 2022 (JP) ................................. 2022-180977

(51) Int. Cl.
G01N 21/65    (2006.01)

(52) U.S. Cl.
CPC ... *G01N 21/65* (2013.01); *G01N 2201/06113* (2013.01)

(58) Field of Classification Search
CPC ......... G01N 21/65; G01N 2201/06113; G01N 21/35; G01J 3/18; G01J 3/2803
See application file for complete search history.

(56) References Cited

U.S. PATENT DOCUMENTS

| | | | | |
|---|---|---|---|---|
| 6,043,893 | A | * | 3/2000 | Treiman .................... G01J 3/42 356/402 |
| 8,274,052 | B1 | * | 9/2012 | Fukuzawa .......... G01N 21/3581 250/341.1 |
| 2008/0150643 | A1 | * | 6/2008 | Suzuki ................. H03B 15/006 257/664 |
| 2015/0333839 | A1 | | 11/2015 | Li et al. |
| 2017/0138789 | A1 | * | 5/2017 | Ivanov ................... G02B 6/305 |
| 2018/0040666 | A1 | * | 2/2018 | Shibata ................ H03H 1/0007 |
| 2018/0184972 | A1 | * | 7/2018 | Carmi .................... G01J 3/2803 |
| 2022/0010423 | A1 | | 1/2022 | Suzuki et al. |
| 2022/0068537 | A1 | | 3/2022 | Mizuno et al. |

(Continued)

FOREIGN PATENT DOCUMENTS

| | | |
|---|---|---|
| JP | 2000-275105 A | 10/2000 |
| JP | 2006-113021 A | 4/2006 |

OTHER PUBLICATIONS

Chen et al.; "All-Optical Switching of Magnetic Tunnel Junctions with Single Subpicosecond Laser Pulses;" Physical Review Applied; 2017; pp. 1-6; vol. 7, pp. 021001-1-021001-6.

(Continued)

*Primary Examiner* — Michelle M Iacoletti
*Assistant Examiner* — Maher Yazback
(74) *Attorney, Agent, or Firm* — Oliff PLC

(57) ABSTRACT

An analysis device includes: at least one magnetic element having a first ferromagnetic layer, a second ferromagnetic layer, and a spacer layer sandwiched between the first ferromagnetic layer and the second ferromagnetic layer; and a light source configured to emit a light, wherein the light is applied to an object to be analyzed, and the at least one magnetic element is configured to detect a reflected light reflected by the object or a transmitted light transmitted through the object.

8 Claims, 16 Drawing Sheets

(56) References Cited

U.S. PATENT DOCUMENTS

| | | | |
|---|---|---|---|
| 2022/0139991 A1* | 5/2022 | Kim | H10B 61/00 257/777 |
| 2022/0260425 A1* | 8/2022 | Jacob | G01J 5/24 |
| 2023/0085052 A1* | 3/2023 | Klein | B01L 3/502738 435/287.2 |
| 2024/0163538 A1* | 5/2024 | Kimura | H04N 23/6812 |

OTHER PUBLICATIONS

Azim et al.; "Optical Receiver With Helicity-Dependent Magnetization Reversal;" IEEE Transactions on Magnetics; 2019; 6 pages; vol. 55, No. 1.

* cited by examiner

"3"

ANALYSIS DEVICE, ANALYSIS SYSTEM AND PORTABLE INFORMATION TERMINAL

CROSS-REFERENCES TO RELATED APPLICATIONS

This application relies for priority upon Japanese Patent Application No. 2022-068883 filed on Apr. 19, 2022, and Japanese Patent Application No. 2022-180977 filed on Nov. 11, 2022, the entire contents of which are hereby incorporated herein by reference for all purposes as if fully set forth herein.

BACKGROUND

The present disclosure relates to an analysis device, an analysis system, and a portable information terminal.

Raman spectroscopic devices, infrared spectroscopic devices, and the like are known as analytical devices that use light. For example, Patent Literature 1 discloses a Raman spectrometer; and Patent Document 2 discloses an infrared spectrometer. A photodetector for detecting light (electromagnetic waves) as an electrical signal is used in the analysis device using light. For example, the Raman spectroscopic device described in Patent Document 1 detects light with a CCD (Charge Coupled Device); and the infrared spectrometer described in Patent Document 2 detects infrared rays with a bolometer.

PATENT DOCUMENTS

[Patent Document 1] Japanese Unexamined Patent Application, First Publication No. 2006-113021
[Patent Document 2] Japanese Unexamined Patent Application, First Publication No. 2000-275105

SUMMARY

Although several types of photodetectors are used for photodetection in spectroscopic devices, there are problems such as difficulty in downsizing. Therefore, new breakthroughs are required for further development of analytical devices using light.

It is desirable to provide a novel and miniaturizable analysis device, an analysis system, and a portable information terminal.

The following means are provided.

An aspect of the present disclosure is an analysis device including: at least one magnetic element having a first ferromagnetic layer, a second ferromagnetic layer, and a spacer layer sandwiched between the first ferromagnetic layer and the second ferromagnetic layer; and a light source configured to emit a light, wherein the light is applied to an object to be analyzed, and the at least one magnetic element is configured to detect a reflected light reflected by the object or a transmitted light transmitted through the object.

Another aspect of the present disclosure is an analysis system including: the analysis device according to the above-described aspect of the present disclosure; and an information storage device, wherein the analysis system configured to recognize information of the object by comparing: a data of the reflected light or the transmitted light that the analysis device detects with the magnetic element; and a data stored in the information storage device.

Another aspect of the present disclosure is a portable information terminal including: the analysis system according to the above-described aspect of the present disclosure; and a display monitor configured to display the information of the object.

DETAILED DESCRIPTION

Figure 1:
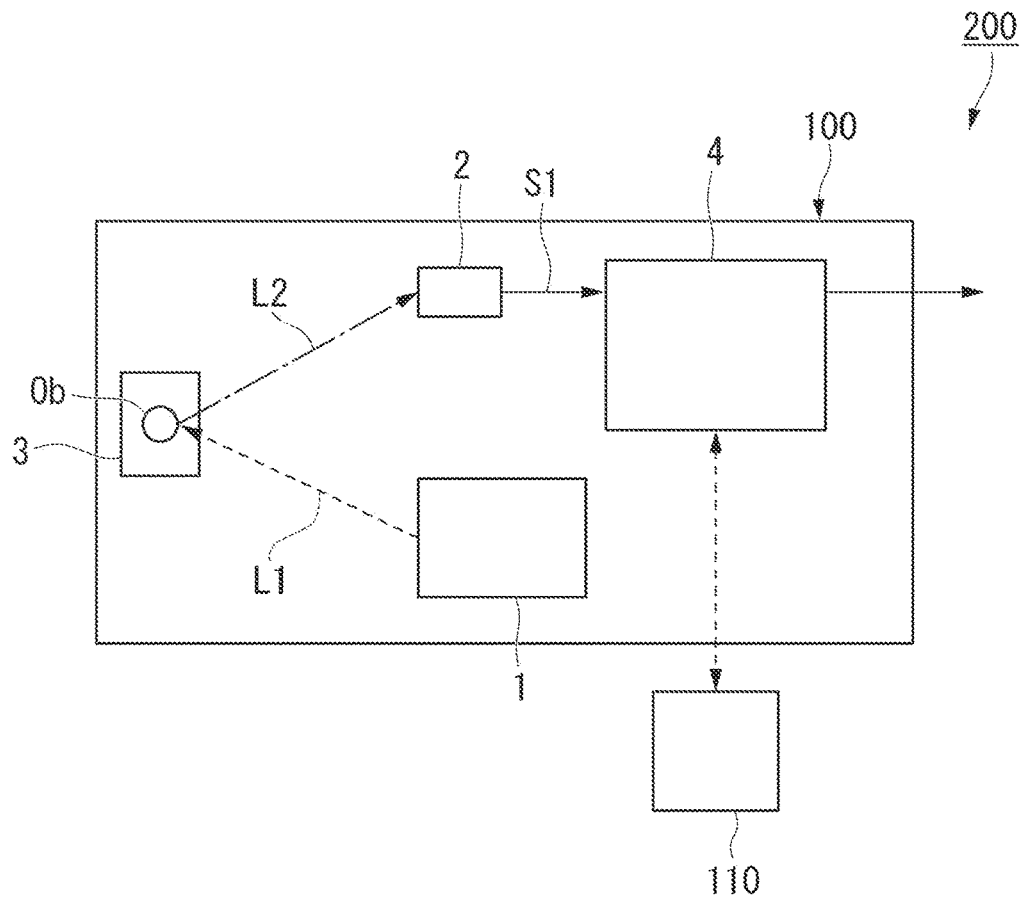
FIG. 1 is a block diagram of an analysis system according to a first embodiment.

Embodiments are described in detail in reference to the drawings. In the drawings used in the following description, a characteristic part may be shown enlarged for convenience in order to make the characteristic part easier to understand, and the dimensional ratio of each component may differ from the actual one. The materials, dimensions, etc. exemplified in the following description are examples, and the present disclosure is not limited thereto, and can be implemented with appropriate changes within the scope of the present disclosure.

The analysis device, the analysis system, and the portable information terminal according to the disclosure can be downsized.

First, directions are defined. The stacking direction of the magnetic element 10 is the z-direction. One direction in the plane perpendicular to the z-direction is the x-direction. A direction perpendicular to the x-direction and the z-direction is the y-direction. Hereinafter, the +z direction may be expressed as "up" (above) and the −z direction as "down" (below). The +z direction is the direction from the second electrode E2 to the first electrode E1. Up and down do not necessarily match the direction in which gravity is applied.

First Embodiment

FIG. 1 is a block diagram of the analysis system according to the first embodiment. The analysis system 200 includes, for example, the analysis device 100 and the information storage device 110. The analysis system 200 recognize information of the object to be analyzed (hereafter referred to as "object") Ob by comparing: the data of the reflected light or the transmitted light that the analysis device detects with the magnetic element; and the data stored in the information storage device 110.

The analysis device 100 detects the reflected light reflected by the object Ob or the transmitted light transmitted through the object Ob. The analysis device 100 shown in FIG. 1 detects the reflected light L2 reflected by the object Ob. The analysis device 100 is, for example, a spectrometer.

Figure 2:
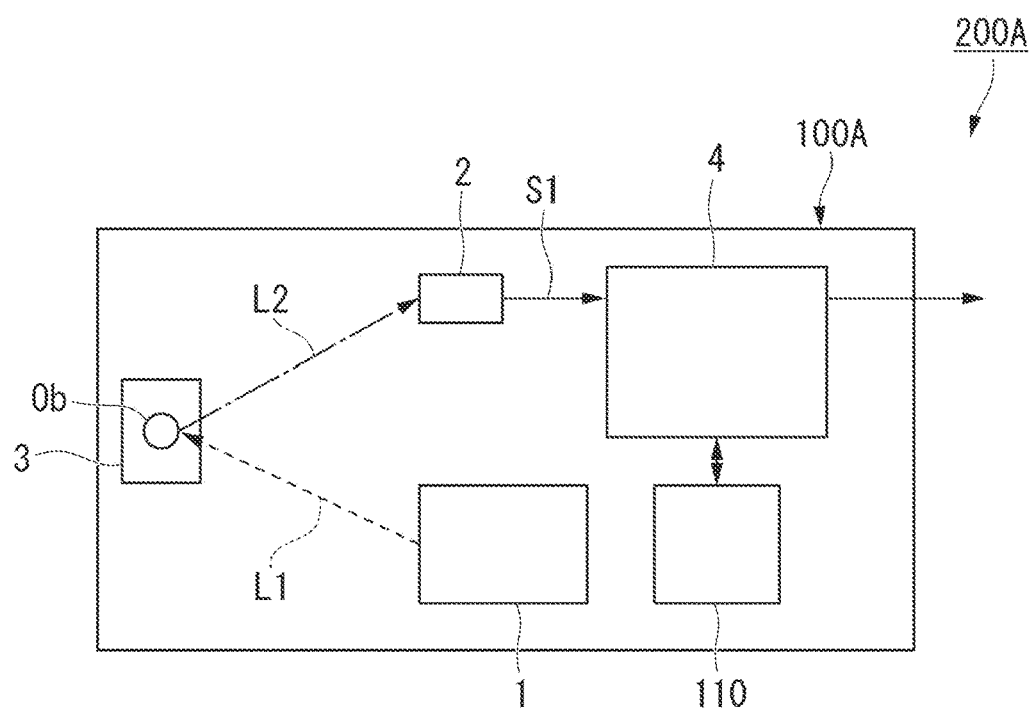
FIG. 2 is a block diagram of another example of the analysis system according to the first embodiment.

Data is stored in the information storage device 110. The information storage device 110 is, for example, an external storage. Access between the analysis device 100 and the information storage device 110 may be wireless or wired. Further, like the analysis system 200A shown in FIG. 2, the information storage device 110 may be an internal storage stored within the analysis device 100A.

The analysis device 100 includes, for example, the light source 1, the photodetector 2, the object setting part 3, and the signal processor 4.

The light source 1 emits the light L1. The analysis device 100 applies the light L1 from the light source 1 onto the object Ob. The light L1 from the light source 1 is applied to the object Ob. The term "light" as used herein includes not only visible light but also infrared rays with longer wavelengths than visible light rays and ultraviolet rays with shorter wavelengths than visible light rays. The wavelength of visible light is, for example, 380 nm or more and less than 800 nm. The wavelength of infrared rays is, for example, 800 nm or more and 1 mm or less. The wavelength of ultraviolet rays is, for example, 200 nm or more and less than 380 nm.

The light source 1 may be a light source that emits light of a single wavelength, such as a laser element such as a laser diode, or a light source that emits light having a continuous spectrum, such as a white light source. For example, when the analysis device 100 is a Raman spectrometer that analyzes the wavelength shift of the scattered light caused by the object Ob, a laser element may be used as the light source 1. The laser element emits light with a wavelength of, for example, 300 nm or more and 2000 nm or less. Further, for example, when the analysis device 100 is an infrared spectrometer that analyzes the absorption of infrared light by the object Ob, a light source that emits light having a continuous spectrum in the infrared region is may be used as the light source 1. The light source 1 is connected to a power supply when in use. The power supply may be internal to the light source 1.

The object setting part 3 is a part where the object Ob is set. Although the details will be described later, the object setting part 3 may be omitted. The object Ob is not particularly limited, and includes, for example, chemical substances such as drugs, cells, viruses, blood, and the like.

The photodetector 2 converts the reflected light L2 reflected by the object Ob into an electrical signal. A specific configuration of the photodetector 2 will be described later.

A signal S1 from the photodetector 2 is input to the signal processor 4. The signal processor 4 has, for example, a signal receiver and a processor. The signal receiver is an input terminal of the signal processor 4. The signal receiving part may further include, for example, an amplifier that amplifies the signal input to the input terminal. The processor is, for example, a CPU (Central Processing Unit). The processor detects the data of the reflected light L2 based on the signal S1 from the photodetector 2, for example, and compares the detected data of the reflected light L2 and the data stored in the information storage device 110. The signal processor 4 outputs, for example, the collation result to the outside. The signal processor 4 may output the data of the detected reflected light L2 to the outside as it is. For example, when the analysis device 100 is a Raman spectrometer, the data of the reflected light reflected by the object Ob or the transmitted light transmitted through the object Ob detected by the analysis device 100; and the data stored in the information storage device 110, are Raman spectra. For example, when the analysis device 100 is an infrared spectrometer, the data of the reflected light reflected by the object Ob or the transmitted light transmitted through the object Ob detected by the analysis device 100; and data stored in the information storage device 110, are IR spectra.

Figure 3:
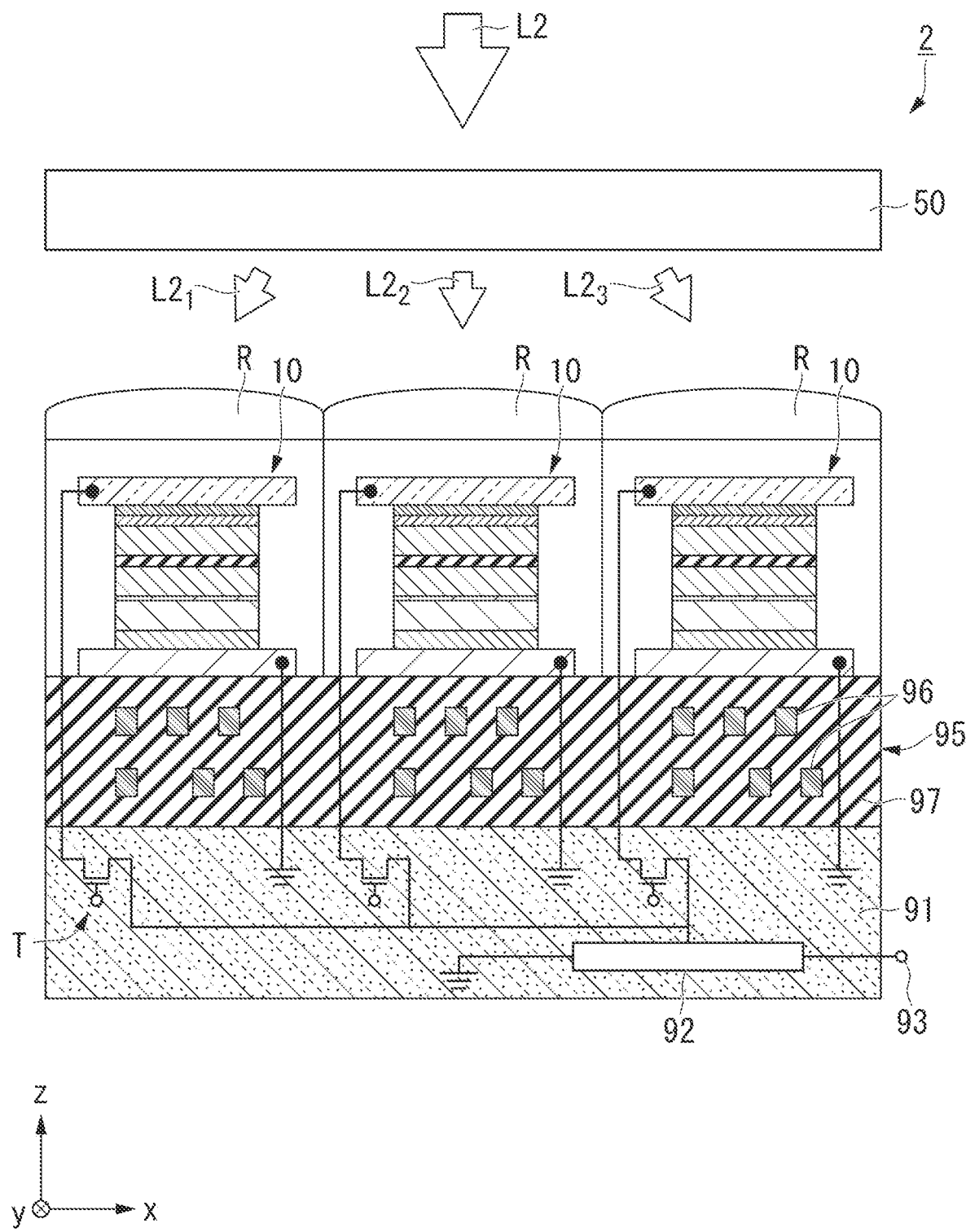
FIG. 3 is a cross-sectional view of the photodetector according to the first embodiment.

FIG. 3 is a cross-sectional view of the photodetector 2 according to the first embodiment. The photodetector 2 includes the magnetic element 10, the spectrometer 50, the lens R, the circuit board 91 and the wiring layer 95.

The circuit board 91 has, for example, the analog-to-digital converter 92 and the output terminal 93. The electrical signal output from the magnetic element 10 is converted into digital data by the analog-to-digital converter 92 and output from the output terminal 93. For example, the output terminal 93 is connected to the signal processor 4.

The wiring layer 95 is formed on the circuit board 91, for example. The wiring layer 95 has the wirings 96. An interlayer insulating film 97 is present between the wirings 96. The wiring 96 electrically connects between each of the magnetic elements 10 and the circuit board 91 and between each arithmetic circuit formed on the circuit board 91. Each of the magnetic elements 10 and the circuit board 91 are connected, for example, via a through-wiring penetrating the interlayer insulating film 97 in the z-direction. Noise can be reduced by shortening the wiring distance between each of the magnetic elements 10 and the circuit board 91.

The wiring 96 has conductivity. The wiring 96 is, for example, Al, Cu, or the like. The interlayer insulating film 97 is an insulator that insulates between wirings of the multi-layer wiring and between elements. The interlayer insulating film 97 is, for example, an oxide, nitride, or oxynitride of Si, Al, or Mg, and the same material as the insulating layer 30 described later can be used.

For example, the magnetic element 10 is formed on the wiring layer 95. For example, there are magnetic elements 10 provided. For example, the magnetic elements 10 are arranged in rows on the wiring layer 95. The magnetic elements 10 may be arranged in a matrix. The magnetic element 10 is irradiated with reflected light reflected by the object Ob or transmitted light transmitted through the object Ob. The analysis device 100 detects the reflected light reflected by the object Ob or the transmitted light transmitted through the object Ob by the magnetic element 10. The analysis device 100 according to the first embodiment detects the reflected light L2 reflected by the object Ob to by the magnetic element 10 shown in FIG. 3. Details of the magnetic element 10 will be described later.

Lens R converges light toward magnetic element 10. The magnetic element 10 is irradiated with light passing through the lens R and converged. Although one magnetic element 10 is arranged below one lens R in FIG. 3, magnetic elements 10 may be arranged below one lens R.

The spectrometer 50 disperses the reflected light reflected by the object Ob or the transmitted light transmitted through the object Ob. The reflected light or transmitted light is applied to the magnetic elements 10 via the spectrometer 50. For example, as shown in FIG. 3, the spectrometer 50 disperses the reflected light L2. The spectrometer 50 is, for example, a wavelength dispersive spectrometer that disperses the reflected light L2 into the light $L2_1$, the light $L2_2$, and light $L2_3$ for each wavelength. The spectrometer 50 is, for example, a prism, a diffraction grating, or the like. The diffraction gratings are, for example, blazed diffraction gratings, holographic diffraction gratings, laminar diffraction gratings.

The magnetic element 10 is a light detection element for detecting the reflected light reflected by the object Ob or the transmitted light transmitted through the object Ob. Each of the magnetic elements 10 is irradiated with the reflected light reflected by the object Ob or the transmitted light transmitted through the object Ob via the spectrometer 50. Each of the magnetic elements 10 shown in FIG. 3 is irradiated with the reflected light L2 reflected by the object Ob via the spectrometer 50. Each of the magnetic elements 10 shown in FIG. 3 is irradiated with light diffracted by the spectrometer 50. For example, one magnetic element 10 is irradiated with light $L2_1$, another magnetic element 10 is irradiated with light $L2_2$, and yet another magnetic element 10 is irradiated with light $L2_3$.

Figure 4:
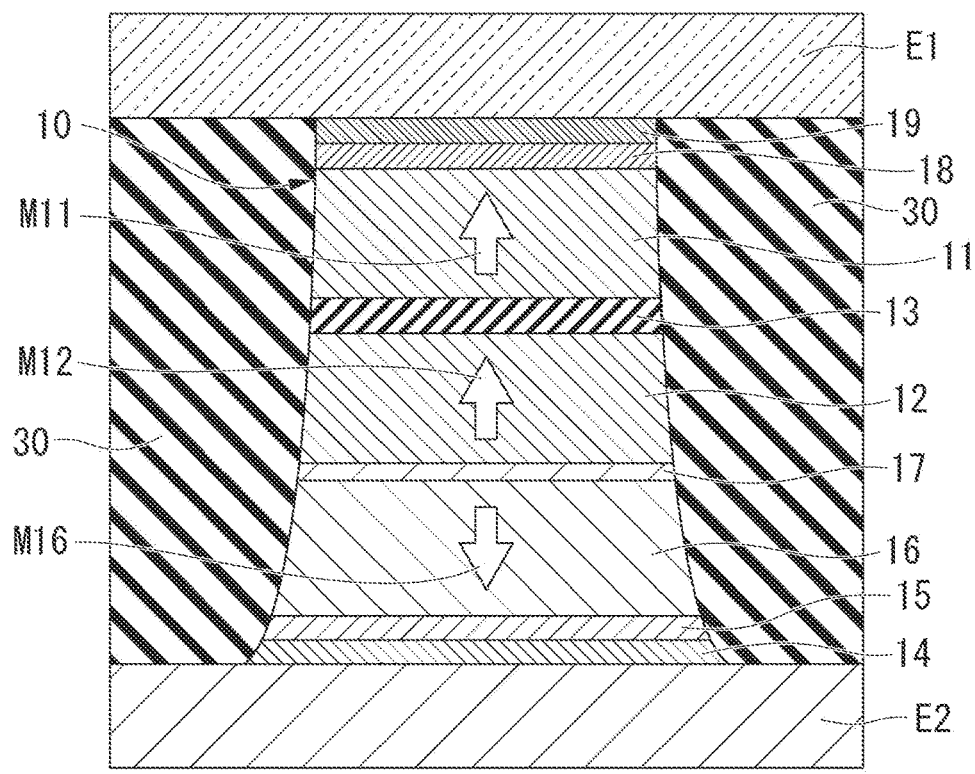
FIG. 4. is a cross-sectional view of a magnetic element according to the first embodiment.
Figure 4:
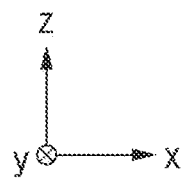
Figure 5A:
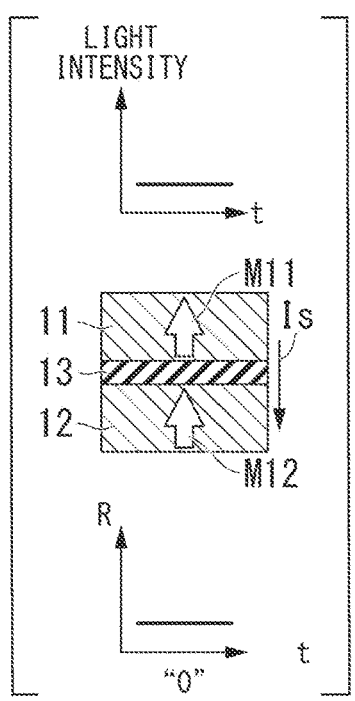
FIG. 5A is a diagram for explaining the first mechanism of the operation example of the magnetic element according to the first embodiment.
Figure 5B:
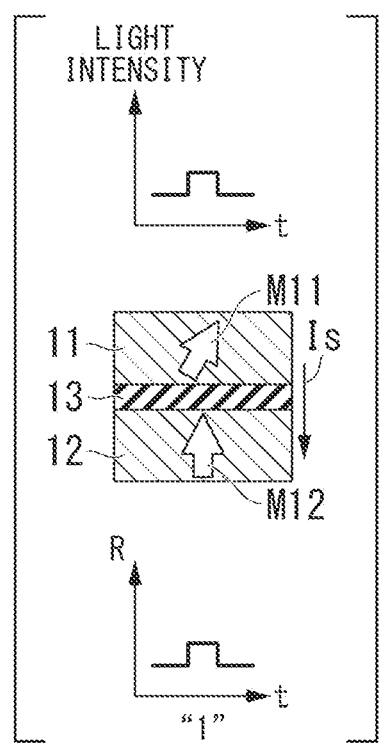
FIG. 5B is a diagram for explaining the first mechanism of the operation example of the magnetic element according to the first embodiment.
Figure 5C:
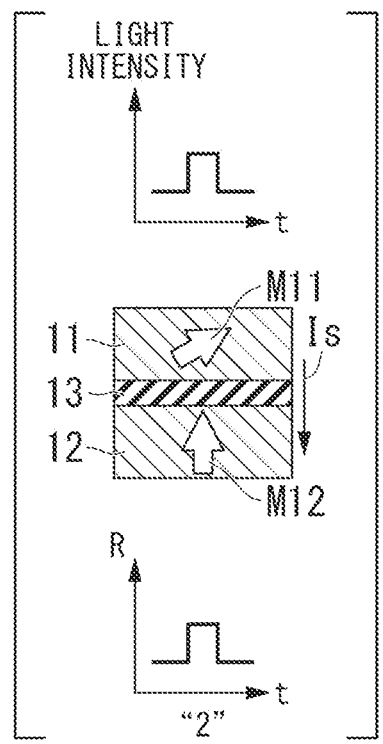
FIG. 5C is a diagram for explaining the first mechanism of the operation example of the magnetic element according to the first embodiment.
Figure 5D:
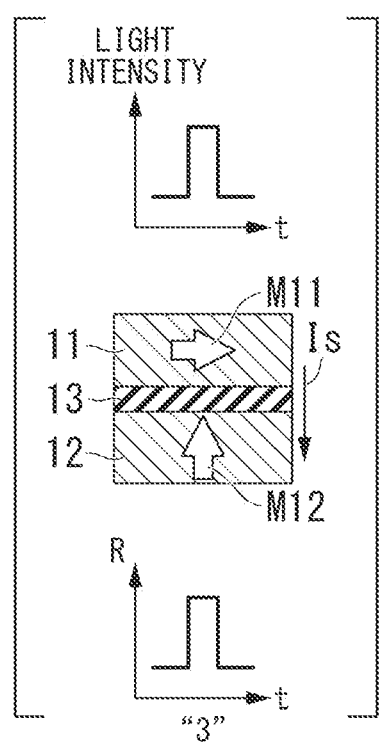
FIG. 5D is a diagram for explaining the first mechanism of the operation example of the magnetic element according to the first embodiment.
Figure 6A:
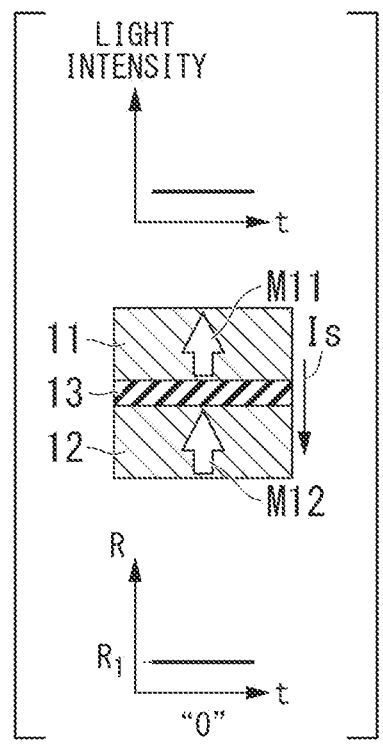
FIG. 6A is a diagram for explaining the second mechanism of the operation example of the magnetic element according to the first embodiment.
Figure 6B:
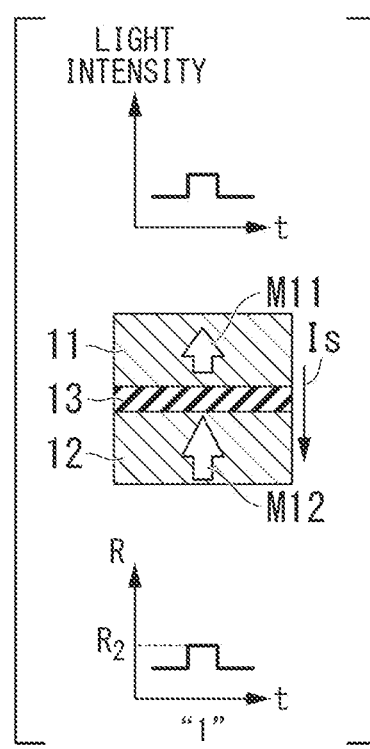
FIG. 6B is a diagram for explaining the second mechanism of the operation example of the magnetic element according to the first embodiment.
Figure 6C:
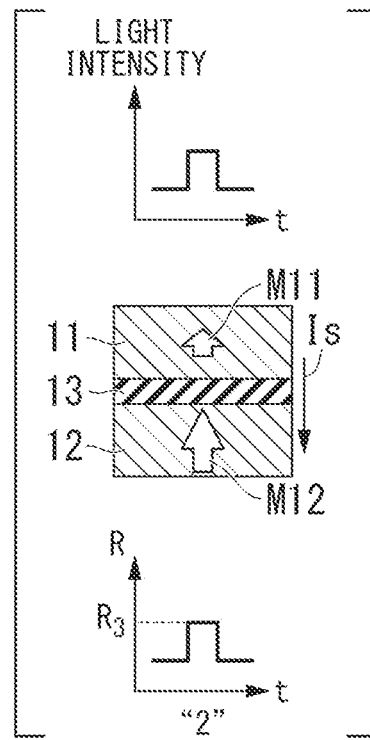
FIG. 6C is a diagram for explaining the second mechanism of the operation example of the magnetic element according to the first embodiment.
Figure 6D:
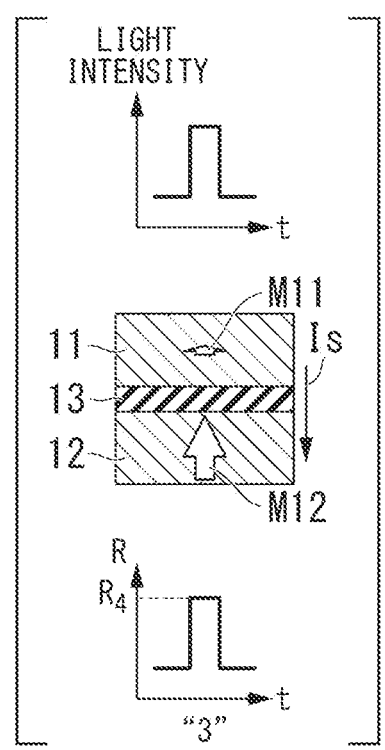
FIG. 6D is a diagram for explaining the second mechanism of the operation example of the magnetic element according to the first embodiment.
Figure 7A:
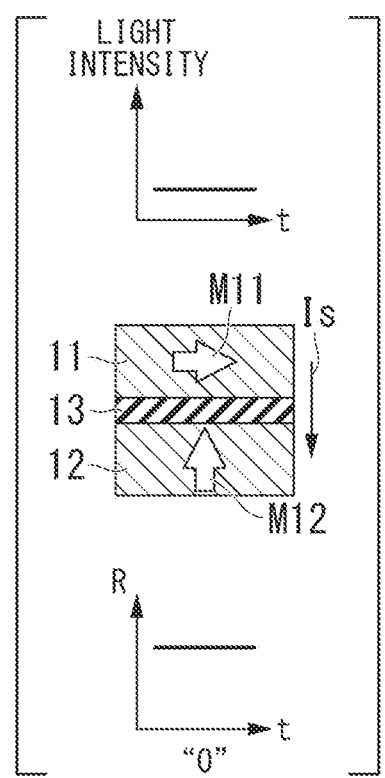
FIG. 7A is a diagram for explaining another example of the operation of the magnetic element according to the first embodiment.
Figure 7B:
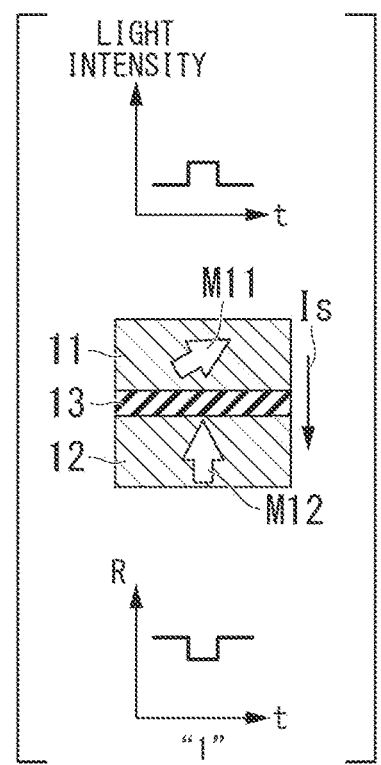
FIG. 7B is a diagram for explaining another example of the operation of the magnetic element according to the first embodiment.
Figure 7C:
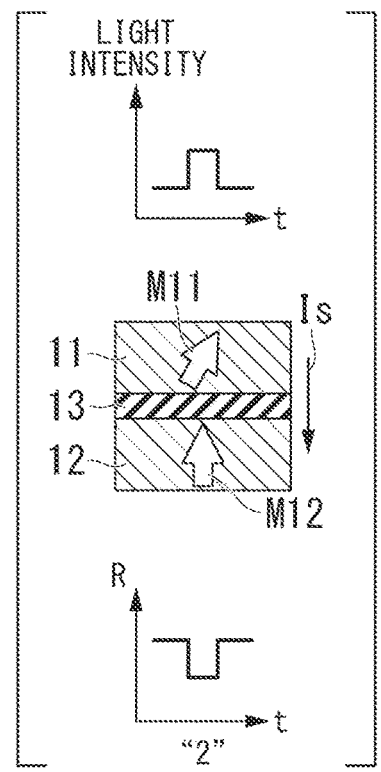
FIG. 7C is a diagram for explaining another example of the operation of the magnetic element according to the first embodiment.
Figure 7D:
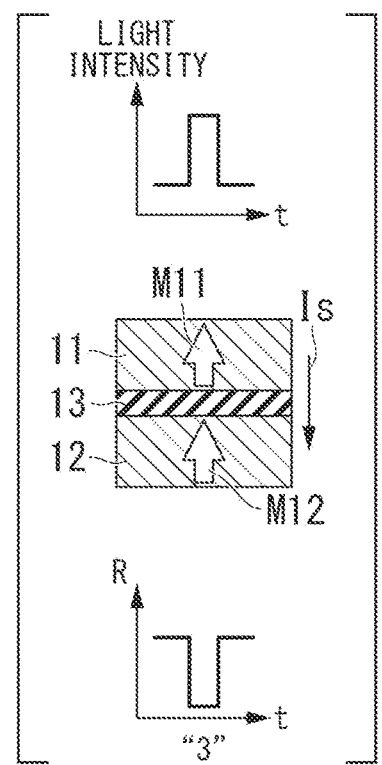
FIG. 7D is a diagram for explaining another example of the operation of the magnetic element according to the first embodiment.
Figure 8A:
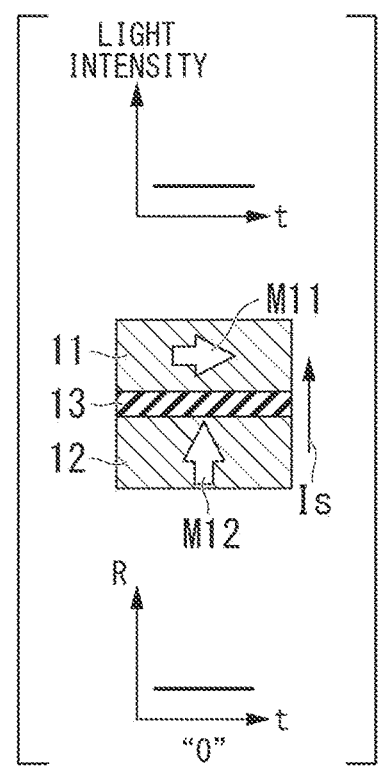
FIG. 8A is a diagram for explaining another example of the operation of the magnetic element according to the first embodiment.
Figure 8B:
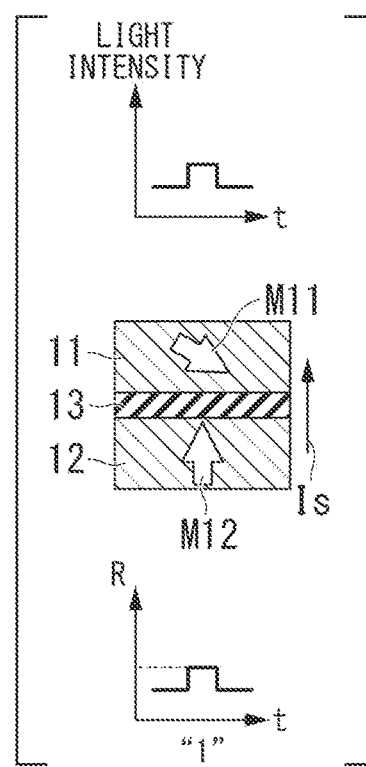
FIG. 8B is a diagram for explaining another example of the operation of the magnetic element according to the first embodiment.
Figure 8C:
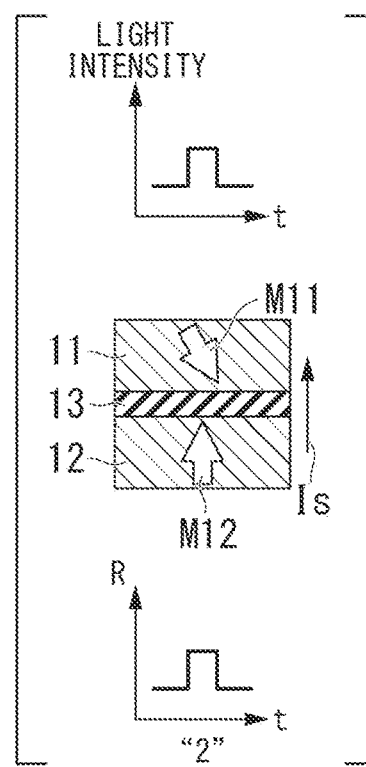
FIG. 8C is a diagram for explaining another example of the operation of the magnetic element according to the first embodiment.
Figure 8D:
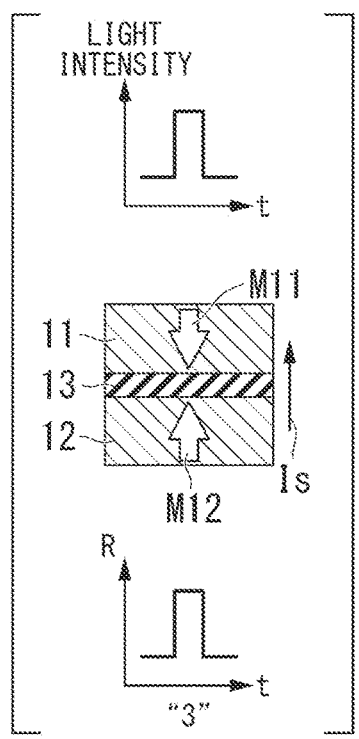
FIG. 8D is a diagram for explaining another example of the operation of the magnetic element according to the first embodiment.

FIG. 4 is a cross-sectional view of the magnetic element 10 according to the first embodiment. In FIG. 4, arrows indicate magnetization directions of the ferromagnetic material in an initial state, which will be described later.

The magnetic element 10 has at least the first ferromagnetic layer 11, the second ferromagnetic layer 12 and the spacer layer 13. The spacer layer 13 is located between the first ferromagnetic layer 11 and the second ferromagnetic layer 12. The magnetic element 10 may have the buffer layer 14, the seed layer 15, the ferromagnetic layer 16, the magnetic coupling layer 17, the perpendicular magnetization inducing layer 18, and the cap layer 19 in addition to these. The buffer layer 14, the seed layer 15, the ferromagnetic layer 16 and the magnetic coupling layer 17 are located between the second ferromagnetic layer 12 and the second electrode E2. The perpendicular magnetization inducing layer 18 and the cap layer 19 are located between the first ferromagnetic layer 11 and the first electrode E1. The periphery of the magnetic element 10 is covered with the insulating layer 30. The insulating layer 30 is located between the first electrode E1 and the second electrode E2.

The magnetic element 10 is, for example, an MTJ (Magnetic Tunnel Junction) element in which the spacer layer 13 is made of an insulating material. The magnetic element 10 changes its resistance value when it is irradiated with light from the outside. The magnetic element 10 changes the resistance value in the z direction (current flow in the z direction) according to the relative change between the state of the magnetization M11 of the first ferromagnetic layer 11 and the state of the magnetization M12 of the second ferromagnetic layer 12. resistance) changes. Such an element is also called a magnetoresistance effect element.

The first ferromagnetic layer 11 is a photodetection layer whose magnetization state changes when irradiated with light from the outside. The first ferromagnetic layer 11 is also called the magnetization free layer. The magnetization free layer is a layer containing a magnetic material whose magnetization state changes when a predetermined external energy is applied. The predetermined external energy is, for example, light applied from the outside, current flowing in the stacking direction of the magnetic element 10, or an external magnetic field. The magnetization M11 of the first ferromagnetic layer 11 changes state according to the intensity of the irradiated light.

The first ferromagnetic layer 11 contains a ferromagnetic material. For example, the first ferromagnetic layer 11 contains at least one of magnetic elements such as Co, Fe or Ni. The first ferromagnetic layer 11 may contain elements such as B, Mg, Hf, and Gd together with the magnetic elements as described above. The first ferromagnetic layer 11 may be, for example, an alloy containing a magnetic element and a non-magnetic element. The first ferromagnetic layer 11 may be composed of multiple layers. The first ferromagnetic layer 11 is, for example, a CoFeB alloy, a laminate in which a CoFeB alloy layer is sandwiched between Fe layers, or a laminate in which a CoFeB alloy layer is sandwiched between CoFe layers. Generally, "ferromagnetism" includes "ferrimagnetism." The first ferromagnetic layer 11 may exhibit ferrimagnetism. On the other hand, the first ferromagnetic layer 11 may exhibit ferromagnetism that is not ferrimagnetism. For example, CoFeB alloys exhibit ferromagnetism rather than ferrimagnetism.

The first ferromagnetic layer 11 may be an in-plane magnetization film having an easy axis of magnetization in the in-plane direction (either direction in the xy plane); or a perpendicular magnetization film having an easy axis of magnetization in the direction perpendicular to the plane (z direction)

The film thickness of the first ferromagnetic layer 11 is, for example, 1 nm or more and 5 nm or less. The film thickness of the first ferromagnetic layer 11 may be 1 nm or more and 2 nm or less. When the first ferromagnetic layer 11 is a perpendicular magnetization film, if the film thickness of the first ferromagnetic layer 11 is small, the effect of applying perpendicular magnetic anisotropy from the layers above and below the first ferromagnetic layer 11 is enhanced; and the perpendicular magnetic anisotropy of the ferromagnetic layer 11 increases. In other words, when the perpendicular magnetic anisotropy of the first ferromagnetic layer 11 is high, the force that causes the magnetization MIT to return to the z-direction increases. On the other hand, when the film thickness of the first ferromagnetic layer 11 is large, the effect of applying perpendicular magnetic anisotropy from the layers above and below the first ferromagnetic layer 11 is relatively weakened; and the perpendicular magnetic anisotropy of the ferromagnetic layer 11 is weakened.

As the thickness of the first ferromagnetic layer 11 becomes thinner, the volume of the ferromagnetic body becomes smaller, and as the thickness of the first ferromagnetic layer 11 becomes larger, the volume of the ferromagnetic body becomes larger. The magnetization responsiveness of the first ferromagnetic layer 11 when external energy is applied is inversely proportional to the product (KuV) of the magnetic anisotropy (Ku) and the volume (V) of the first ferromagnetic layer 11. In other words, when the product of the magnetic anisotropy and the volume of the first ferromagnetic layer 11 becomes small, the reactivity to light increases. From this point of view, in order to enhance the response to light, the magnetic anisotropy of the first ferromagnetic layer 11 may be designed and the volume of the first ferromagnetic layer 11 may be reduced.

When the film thickness of the first ferromagnetic layer 11 is thicker than 2 nm, an insertion layer made of, for example, Mo and W may be provided in the first ferromagnetic layer 11. In other words, the first ferromagnetic layer 11 may be a laminate in which a ferromagnetic layer, an insertion layer, and a ferromagnetic layer are laminated in order in the z-direction. Perpendicular magnetic anisotropy of the entire first ferromagnetic layer 11 increases due to interfacial magnetic anisotropy at the interface between the insertion layer and the ferromagnetic layer. The film thickness of the insertion layer is, for example, 0.1 nm to 1.0 nm.

The second ferromagnetic layer 12 is a magnetization fixed layer. The magnetization fixed layer is a layer made of a magnetic material whose magnetization state is less likely to change than the magnetization free layer when a predetermined external energy is applied. For example, the magnetization direction of the magnetization fixed layer is less likely to change than the magnetization direction of the magnetization free layer when a predetermined external energy is applied. Further, for example, the magnetization fixed layer is less likely to change in magnitude of magnetization than the magnetization free layer when a predetermined external energy is applied. The coercive force of the second ferromagnetic layer 12 is, for example, greater than the coercive force of the first ferromagnetic layer 11. For example, the second ferromagnetic layer 12 has an easy magnetization axis in the same direction as the first ferromagnetic layer 11. The second ferromagnetic layer 12 may be an in-plane magnetization film or a perpendicular magnetization film. The film thickness of the second ferromagnetic layer 12 is, for example, 1 nm or more and 5 nm or less.

The material forming the second ferromagnetic layer 12 is, for example, the same as that of the first ferromagnetic layer 11. The second ferromagnetic layer 12 may be, for example, a multilayer film in which Co with a thickness of 0.4 nm to 1.0 nm and Pt with a thickness of 0.4 nm to 1.0 nm are alternately laminated several times. The second ferromagnetic layer 12 may be a laminate body in which Co with a thickness of 0.4 nm to 1.0 nm, Mo with a thickness of 0.1 nm to 0.5 nm, CoFeB alloy with a thickness of 0.3 nm to 1.0 nm, and Fe with a thickness of 0.3 nm to 1.0 nm are laminated in the order.

The magnetization of the second ferromagnetic layer 12 may be fixed, for example, by magnetic coupling with the ferromagnetic layer 16 sandwiching the magnetic coupling layer 17. In this case, the combination of the second ferromagnetic layer 12, the magnetic coupling layer 17 and the ferromagnetic layer 16 may be called a magnetization fixed layer. Details of the magnetic coupling layer 17 and the ferromagnetic layer 16 will be described later.

The spacer layer 13 is a layer arranged between the first ferromagnetic layer 11 and the second ferromagnetic layer 12. The spacer layer 13 is composed of a layer composed of a conductor, an insulator, or a semiconductor, or a layer including a energizing point composed of a conductor in an insulator. The spacer layer 13 is, for example, a non-magnetic layer. The film thickness of the spacer layer 13 can be adjusted according to the orientation directions of the magnetization of the first ferromagnetic layer 11 and the magnetization of the second ferromagnetic layer 12 in the initial state, which will be described later.

For example, when the spacer layer 13 is made of an insulator, the magnetic element 10 has a magnetic tunnel junction (MTJ) made up of the first ferromagnetic layer 11, the spacer layer 13, and the second ferromagnetic layer 12. Such an element is called an MTJ element. In this case, the magnetic element 10 can exhibit a tunnel magnetoresistance (TMR) effect. For example, when the spacer layer 13 is made of metal, the magnetic element 10 can exhibit a giant magnetoresistive (GMR) effect. Such an element is called a GMR element. The magnetic element 10 may be called an MTJ element, a GMR element, or the like depending on the constituent material of the spacer layer 13, but is also generically called a magnetoresistance effect element.

When the spacer layer 13 is made of an insulating material, a material containing aluminum oxide, magnesium oxide, titanium oxide, silicon oxide, or the like can be used as the material of the spacer layer 13. In addition, these insulating materials may contain elements such as Al, B, Si and Mg, and magnetic elements such as Co, Fe and Ni. By adjusting the film thickness of the spacer layer 13 so that a high TMR effect is exhibited between the first ferromagnetic layer 11 and the second ferromagnetic layer 12, a high magnetoresistance ratio can be obtained. In order to efficiently utilize the TMR effect, the film thickness of the spacer layer 13 may be about 0.5-5.0 nm, or about 1.0-2.5 nm.

When the spacer layer 13 is made of a non-magnetic conductive material, a conductive material such as Cu, Ag, Au or Ru can be used. In order to efficiently utilize the GMR effect, the film thickness of the spacer layer 13 may be about 0.5-5.0 nm, or about 2.0-3.0 nm.

When the spacer layer 13 is made of a nonmagnetic semiconductor material, materials such as zinc oxide, indium oxide, tin oxide, germanium oxide, gallium oxide, and ITO can be used. In this case, the film thickness of the spacer layer 13 may be about 1.0 to 4.0 nm.

When a layer containing an energizing point made of a conductor in a non-magnetic insulator is used as the spacer layer 13, the layer may have a structure including the energizing point constituted by a non-magnetic conductor such as Cu, Au or Al in the non-magnetic insulator made of aluminum oxide or magnesium oxide. It is also possible to have a structure including the energizing point constituted by a conductor such as Co, Fe, or Ni. In this case, the film thickness of the spacer layer 13 may be about 1.0 to 2.5 nm. The energizing point is, for example, a column having a diameter of 1 nm or more and 5 nm or less when viewed in a direction perpendicular to the film surface.

The ferromagnetic layer 16 is magnetically coupled with the second ferromagnetic layer 12, for example. Magnetic coupling is, for example, antiferromagnetic coupling and is caused by RKKY interactions. The direction of the magnetization M12 of the second ferromagnetic layer 12 and the direction of the magnetization M16 of the ferromagnetic layer 16 are antiparallel. The material of the ferromagnetic layer 16 is, for example, the same as that of the first ferromagnetic layer 11.

A magnetic coupling layer 17 is located between the second ferromagnetic layer 12 and the ferromagnetic layer 16. The magnetic coupling layer 17 is Ru, Ir, or the like, for example.

The buffer layer 14 is a layer that relaxes lattice mismatch between different crystals. The buffer layer 14 contains, for example, a metal containing at least one element selected from the group consisting of Ta, Ti, Zr and Cr, or at least one element selected from the group consisting of Ta, Ti, Zr and Cu. Nitride. More specifically, the buffer layer 14 is, for example, Ta (single substance), NiCr alloy, TaN (tantalum nitride), CuN (copper nitride). The film thickness of the buffer layer 14 is, for example, 1 nm or more and 5 nm or less. For example, the buffer layer 14 is amorphous. The buffer layer 14 is positioned, for example, between the seed layer 15 and the second electrode E2 and is in contact with the second electrode E2. The buffer layer 14 suppresses the crystal structure of the second electrode E2 from affecting the crystal structure of the second ferromagnetic layer 12.

Seed layer 15 enhances the crystallinity of the layers stacked on the seed layer 15. The seed layer 15 is located, for example, between the buffer layer 14 and the ferromagnetic layer 16 and overlies the buffer layer 14. The seed layer 15 is, for example, Pt, Ru, Zr, NiFeCr. The film thickness of the seed layer 15 is, for example, 1 nm or more and 5 nm or less.

The cap layer 19 is located between the first ferromagnetic layer 11 and the first electrode E1. The cap layer 19 may include a perpendicular magnetization inducing layer 18 stacked on the first ferromagnetic layer 11 and in contact with the first ferromagnetic layer 11. The cap layer 19 prevents damage to the underlying layer during the process and enhances the crystallinity of the underlying layer during annealing. The film thickness of the cap layer 19 is, for example, 10 nm or less so that the first ferromagnetic layer 11 is sufficiently irradiated with light.

The perpendicular magnetization inducing layer 18 induces perpendicular magnetic anisotropy of the first ferromagnetic layer 11. The perpendicular magnetization inducing layer 18 is, for example, magnesium oxide, W, Ta, Mo, or the like. When the perpendicular magnetization inducing layer 18 is magnesium oxide, the magnesium oxide may be oxygen-deficient in order to increase conductivity.

The film thickness of the perpendicular magnetization inducing layer 18 is, for example, 0.5 nm or more and 5.0 nm or less.

The shape of the magnetic element 10 is columnar. The shape of the magnetic element 10 may be cylindrical or prismatic. The width of the magnetic element 10 when viewed in the z direction can be, for example, 10 nm or more and 2000 nm or less. The width of the magnetic element 10 when viewed in the z direction may be 30 nm or more and 500 nm or less. The length of the magnetic element 10 in the z direction can be, for example, 30 nm or more and 100 nm or less. As described above, the size of the magnetic element 10, which is a photodetector, can be made much smaller than that of a conventional photodetector such as a photomultiplier tube, so that the size of the analysis device 100 can be reduced.

The insulating layer 30 is, for example, an oxide, nitride, or oxynitride of Si, Al, or Mg. The insulating layer 30 is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), and the like.

The first electrode E1 is arranged, for example, on the side where the magnetic element 10 is irradiated with light. A part of the reflected light L2 (for example, any of light $L2_1$, light $L2_2$, and light $L2_3$) is applied to the magnetic element 10 from the first electrode E1 side, and is applied to at least the first ferromagnetic layer 11. The first electrode E1 is made of a conductive material. The first electrode E1 is, for example, a transparent electrode that is transparent to light in the wavelength band used. The first electrode E1 may transmit, for example, 80% or more of the light in the working wavelength band. The first electrode E1 is, for example, an oxide such as indium tin oxide (ITO), indium zinc oxide (IZO), zinc oxide (ZnO), or indium gallium zinc oxide (IGZO). The first electrode E1 may be configured to have columnar metals in the transparent electrode material of these oxides. It is not essential to use the transparent electrode material as described above for the first electrode E1, and by using a metal material such as Au, Cu, or Al in a thin film thickness, the applied light can reach the first ferromagnetic layer 11. When metal is used as the material for the first electrode E1, the film thickness of the first electrode E1 is, for example, 3 to 10 nm. Further, the first electrode E1 may have an antireflection film on the irradiation surface irradiated with light.

The second electrode E2 is on the side opposite to the first electrode E1 with the magnetic element 10 interposed therebetween. The second electrode E2 is made of a conductive material. For example, the second electrode E2 is made of metal such as Cu, Al, or Au. Ta or Ti may be stacked above and below these metals. Alternatively, a laminated film of Cu and Ta, a laminated film of Ta, Cu and Ti, or a laminated film of Ta, Cu and TaN may be used. Alternatively, TiN or TaN may be used as the second electrode E2. The film thickness of the second electrode E2 is, for example, 200 nm to 800 nm.

The second electrode E2 may be transparent to the light applied to the magnetic element 10. As a material for the second electrode E2, similar to the first electrode E1, for example, oxides such as indium tin oxide (ITO), indium zinc oxide (IZO), zinc oxide (ZnO), and indium gallium zinc oxide (IGZO) are used. A transparent electrode material may also be used. Even when the light is applied from the first electrode E1, the light may reach the second electrode E2 depending on the intensity of the light. In this case, since the second electrode E2 is configured to include a transparent electrode material of oxide, light reflection at the interface between the second electrode E2 and the layer in contact therewith can be suppressed compared to the case where the second electrode E2 is made of metal.

Next, operation of the analysis system 200 according to the first embodiment will be described. First, the light source 1 emits light L1. Part of the light L1 is applied to the object Ob. The reflected light L2 reflected by the object Ob is applied to the photodetector 2

The reflected light L2 applied to the photodetector 2 is dispersed by the spectrometer 50, for example, for each wavelength. For example, each of the dispersed lights $L2_1$, $L2_2$ and $L2_3$ is applied to different magnetic elements 10. Each of the lights $L2_1$, $L2_2$ and $L2_3$ may be converged by the lens R.

For example, when any of the magnetic elements 10 is irradiated with any of the light $L2_1$, $L2_2$ and $L2_3$, the magnetic element 10 generates an output voltage. That is, the magnetic element 10 converts the irradiated light into an electrical signal.

The output voltage from the magnetic element 10 changes according to the intensity of light applied to the first ferromagnetic layer 11. Changes in the resistance values of the first ferromagnetic layer 11, the second ferromagnetic layer 12, and the spacer layer 13 in the stacking direction contribute to the change in the output voltage from the magnetic element 10. Although the exact mechanism by which the output voltage from the magnetic element 10 changes due to light irradiation has not yet been clarified, for example, the following two mechanisms are conceivable.

FIGS. 5A to 5D are diagrams for explaining the first mechanism of the operation example of the magnetic element 10. In the upper graphs of FIGS. 5A to 5D, the vertical axis represents the intensity of light applied to the first ferromagnetic layer 11, and the horizontal axis represents time. In the lower graphs of FIGS. 5A to 5D, the vertical axis represents the resistance value of the magnetic element 10 in the z direction, and the horizontal axis represents time. In FIGS. 5A to 5D, only the first ferromagnetic layer 11, the second ferromagnetic layer 12 and the spacer layer 13 of the magnetic element 10 are shown.

First, in a state where the first ferromagnetic layer 11 is irradiated with light of a first intensity (hereinafter referred to as an initial state), the magnetization M11 of the first ferromagnetic layer 11 and the magnetization M12 of the second ferromagnetic layer 12 are parallel. The resistance value in the z direction of the magnetic element 10 indicates a first resistance value R1, and the magnitude of the output voltage from the magnetic element 10 indicates a first value. The first intensity may be a value when the intensity of the light applied to the first ferromagnetic layer 11 is zero.

As for the resistance value of the magnetic element 10 in the z direction, a voltage is generated at both ends of the magnetic element 10 in the z direction by flowing the sense current Is in the z direction of the magnetic element 10. It is obtained from the voltage value using Ohm's law. An output voltage from the magnetic element 10 is generated between the first electrode E1 and the second electrode E2. In the example shown in FIGS. 5A-5D, the sense current Is flows from the first ferromagnetic layer 11 toward the second ferromagnetic layer 12. By passing the sense current Is in this direction, a spin transfer torque in the same direction as the magnetization M12 of the second ferromagnetic layer 12 acts on the magnetization M11 of the first ferromagnetic layer 11. In the initial state, the magnetization M11 and the magnetization M12 are parallel. Also, by passing the sense current Is in this direction, it is possible to prevent the magnetization M11 of the first ferromagnetic layer 11 from reversing during operation.

Then, the intensity of light applied to the first ferromagnetic layer 11 changes. The magnetization M11 of the first ferromagnetic layer 11 is tilted from the initial state by energy from outside due to light irradiation. The angle between the direction of the magnetization M11 of the first ferromagnetic layer 11 when the first ferromagnetic layer 11 is not irradiated with light and the direction of the magnetization M11 when the first ferromagnetic layer 11 is irradiated with light is greater than 0° and less than 90°.

When the magnetization M11 of the first ferromagnetic layer 11 tilts from the initial state, the z-direction resistance of the magnetic element 10 changes from the initial state. Then, the output voltage from the magnetic element 10 changes from the initial state. For example, according to the inclination of the magnetization M11 of the first ferromagnetic layer 11, the z-direction resistance value of the magnetic element 10 changes to a second resistance value R2, a third resistance value R3, and a fourth resistance value R4. Then, the output voltage from the magnetic element 10 changes between a second value, a third value, and a fourth value. The resistance values increase in order of the first resistance value $R_1$, the second resistance value $R_2$, the third resistance value $R_3$, and the fourth resistance value $R_4$. Each of the second resistance value R2, the third resistance value R3, and the fourth resistance value $R_4$ is a resistance value between the resistance values when the magnetizations M11 and M12 are parallel (first resistance value R1) and the resistance value when the magnetizations M11 and M12 are antiparallel. The output voltage from the magnetic element 10 increases in the order of the first value, second value, third value, and fourth value.

The magnetic element 10 changes the output voltage (the resistance value of the magnetic element 10 in the z direction) when the intensity of light applied to the first ferromagnetic layer 11 changes. For example, when the first value (first resistance value $R_1$) is defined as "0", the second value (second resistance value $R_2$) is defined as "1", the third value (third resistance value $R_3$) is defined as "2" and the fourth value (fourth resistance value $R_4$) is defined as "3", quaternary information can be read from the magnetic element 10. That is, by prescribing the correspondence relationship between the intensity of light applied to the first ferromagnetic layer 11 and the output voltage from the magnetic element 10, the intensity of light can be detected as the output voltage. Although four values are read as an example here, the number of values to be read can be freely designed by setting the threshold value of the output voltage from the magnetic element 10 (resistance value of the magnetic element 10). Further, the analog value of the output voltage of the magnetic element 10 may be used as it is, and the light intensity that changes in an analog manner may be detected as the analog output voltage.

A spin transfer torque in the same direction as the magnetization M12 of the second ferromagnetic layer 12 acts on the magnetization M11 of the first ferromagnetic layer 11. Therefore, when the first ferromagnetic layer 11 is not irradiated with light, the magnetization M11 tilted from the initial state returns to the state parallel to the magnetization M12. When the magnetization M11 and the magnetization M12 return to the parallel state, the z-direction resistance of the magnetic element 10 returns to the first resistance R1.

Here, the case where the magnetization M11 and the magnetization M12 are parallel in the initial state has been described as an example, but the magnetization M11 and the magnetization M12 may be antiparallel in the initial state. In this case, the resistance value of the magnetic element 10 in the z direction decreases as the magnetization M11 tilts (as the angle change from the initial state of the magnetization M11 increases). When the magnetization M11 and the magnetization M12 are antiparallel in the initial state, the sense current Is may flow from the second ferromagnetic layer 12 toward the first ferromagnetic layer 11. By passing the sense current Is in this direction, a spin transfer torque in the opposite direction to the magnetization M12 of the second ferromagnetic layer 12 acts on the magnetization M11 of the first ferromagnetic layer 11, and in the initial state, the magnetization M11 and The magnetization M12 becomes antiparallel.

FIGS. 6A to 6D are diagrams for explaining the second mechanism of the operation example of the magnetic element 10. In the upper graphs of FIGS. 6A to 6D, the vertical axis represents the intensity of light applied to the first ferromagnetic layer 11, and the horizontal axis represents time. In the lower graphs of FIGS. 6A to 6D, the vertical axis represents the resistance value of the magnetic element 10 in the z direction, and the horizontal axis represents time.

The states of the magnetization M11 and the magnetization M12 in the initial state shown in FIGS. 6A to 6D are the same as the states of the magnetization M11 and the magnetization M12 in the initial state shown in FIGS. 5A to 5D. In the case of the examples shown in FIGS. 6A to 6D as well, the sense current Is may flow from the first ferromagnetic layer 11 toward the second ferromagnetic layer 12. By passing the sense current Is in this direction, a spin transfer torque in the same direction as the magnetization M12 of the second ferromagnetic layer 12 acts on the magnetization M11 of the first ferromagnetic layer 11, and in the initial state, the magnetization M11 and magnetization M12 becomes parallel.

Then, the intensity of light with which the first ferromagnetic layer 11 is irradiated changes. The magnitude of the magnetization M11 of the first ferromagnetic layer 11 is reduced from the initial state by energy from outside due to light irradiation. When the magnetization M11 of the first ferromagnetic layer 11 decreases from the initial state, the z-direction resistance of the magnetic element 10 changes. Then, the output voltage from the magnetic element 10 changes. For example, depending on the magnitude of the magnetization M11 of the first ferromagnetic layer 11, the z-direction resistance of the magnetic element 10 changes to the second resistance R2, the third resistance R3, and the fourth resistance R4; and the output voltage from the magnetic element 10 changes between the second value, the third value, and the fourth value. The resistance values increase in order of the first resistance value $R_1$, the second resistance value $R_2$, the third resistance value $R_3$, and the fourth resistance value $R_4$. The output voltage from the magnetic element 10 increases in the order of the first value, the second value, the third value, and the fourth value. Therefore, as in the case of FIGS. 5A to 5D, by defining the correspondence relationship between the intensity of light applied to the first ferromagnetic layer 11 and the output voltage from the magnetic element 10, the intensity of light can be detected as an output voltage.

Also in the case of the second mechanism, similarly to the case of the first mechanism, when the intensity of the light with which the first ferromagnetic layer 11 is irradiated returns to the first intensity, the state of the magnetization M11 of the first ferromagnetic layer 11 changes and returns to the initial state.

Also in FIGS. 6A to 6D, the magnetization M11 and the magnetization M12 may be antiparallel in the initial state. In this case, the z-direction resistance of the magnetic element 10 decreases as the magnitude of the magnetization M11 decreases. When the magnetization M11 and the magnetization M12 are antiparallel in the initial state, the sense current Is may flow from the second ferromagnetic layer 12 toward the first ferromagnetic layer 11.

Also, up to this point, the magnetization M11 and the magnetization M12 are parallel or antiparallel in the initial state, but the magnetization M11 and the magnetization M12 may be orthogonal in the initial state. For example, a case, in which the first ferromagnetic layer 11 is an in-plane magnetization film in which the magnetization M11 is oriented in any direction of the xy plane in the initial state, and the second ferromagnetic layer 12 is a perpendicular magnetization film in which the magnetization M12 is oriented in the z direction, corresponds to the case. Magnetic anisotropy causes the magnetization M11 to be oriented in one of the xy planes and the magnetization M12 to be oriented in the z direction, so that the magnetizations M11 and M12 are orthogonal to each other in the initial state.

FIGS. 7A to 7D and FIGS. 8A to 8D are diagrams for explaining another example of the operation of the magnetic element 10 according to the first embodiment. FIGS. 7A to 7D and FIGS. SA to 8D show only the first ferromagnetic layer 11, the second ferromagnetic layer 12 and the spacer layer 13 of the magnetic element 10. FIGS. 7A to 7D and FIGS. 8A to 8D differ in the flow direction of the sense current Is applied to the magnetic element 10. In FIGS. 7A to 7D, the sense current Is flows from the first ferromagnetic layer 11 toward the second ferromagnetic layer 12. In FIGS. 8A to 8D, the sense current Is flows from the second ferromagnetic layer 12 toward the first ferromagnetic layer 11.

In any one of FIGS. 7A to 7D and FIGS. 8A to 8D, the flow of the sense current Is in the magnetic element 10 causes a spin transfer torque to act on the magnetization M11 in the initial state. In the case of FIGS. 7A to 7D, the spin transfer torque acts so that the magnetization M11 becomes parallel to the magnetization M12 of the second ferromagnetic layer 12. In FIGS. 8A to 8D, the spin transfer torque acts so that the magnetization M11 becomes antiparallel to the magnetization M12 of the second ferromagnetic layer 12. In FIGS. 7A to 7D and FIGS. 8A to 8D, in the initial state, the effect of the magnetic anisotropy on the magnetization M11 is greater than the effect of the spin transfer torque and faces in either direction.

When the intensity of the light applied to the first ferromagnetic layer 11 increases, the magnetization M11 of the first ferromagnetic layer 11 is tilted from the initial state by energy from outside due to the light irradiation. This is because the sum of the effect of the light irradiation and the effect of the spin transfer torque applied to the magnetization M11 is greater than the effect of the magnetic anisotropy on the magnetization M11. As the intensity of the light applied to the first ferromagnetic layer 11 increases, the magnetization M11 in the case of FIGS. 7A to 7D inclines so as to be parallel to the magnetization M2 of the second ferromagnetic layer 12; and the magnetization M11 in the case of FIGS. 8A to 8D inclines so as to be antiparallel to the magnetization M12 of the second ferromagnetic layer 12. Since the direction of the spin transfer torque acting on the magnetization M11 is different, the direction of inclination of the magnetization M11 is different between FIGS. 7A to 7D and FIGS. 8A to 8D.

When the intensity of the light applied to the first ferromagnetic layer 11 increases, the resistance value of the magnetic element 10 decreases and the output voltage from the magnetic element 10 decreases in the case of FIGS. 7A to 7D. In the cases of FIGS. 8A to 8D, the resistance value of the magnetic element 10 increases, and the output voltage from the magnetic element 10 increases.

When the intensity of the light applied to the first ferromagnetic layer 11 returns to the first intensity, the state of the magnetization M11 of the first ferromagnetic layer 11 returns to the initial state due to the action of the magnetic anisotropy on the magnetization M11.

Although the first ferromagnetic layer 11 is an in-plane magnetization film and the second ferromagnetic layer 12 is a perpendicular magnetization film in this example, the relationship may be reversed. That is, in the initial state, the magnetization M11 may be oriented in the z direction, and the magnetization M12 may be oriented in any direction within the xy plane.

At least one of the magnetic elements 10 may have a different element configuration from the other magnetic elements 10. For example, each magnetic element 10 may have a different element configuration depending on the wavelength of the irradiated light. The magnetic elements 10 may have the same element configuration. Since the state of the magnetization M11 of the first ferromagnetic layer 11 of the magnetic element 10 changes according to the intensity of light with a wide range of wavelengths including ultraviolet light, visible light, and infrared light, the magnetic elements 10 element configurations can be the same as each other.

Each magnetic element 10 converts, for example, the light $L2_1$, the light $L2_2$, and the light $L2_3$ with different wavelengths into electric signals. As a result, the signal S1 corresponding to the irradiation of the reflected light L2 is output from the photodetector 2. The signal S1 is, for example, an output voltage from each magnetic element 10, and is a signal corresponding to the intensity of each of the light $L2_1$, the light $L2_2$, and the light $L2_3$ having different wavelengths.

The signal S1 is sent to the signal processor 4. The signal processor 4 monitors the signal S1 and stores it in the memory. The signal processor 4 compares the data of the reflected light L2 based on the stored signal S1 and the data stored in the information storage device 110. The data stored in the information storage device 110 is, for example, pre-sampled dictionary data. Based on the comparison result of the two data, the signal processor 4 recognizes the information of the object Ob and outputs it to the outside.

Figure 9:
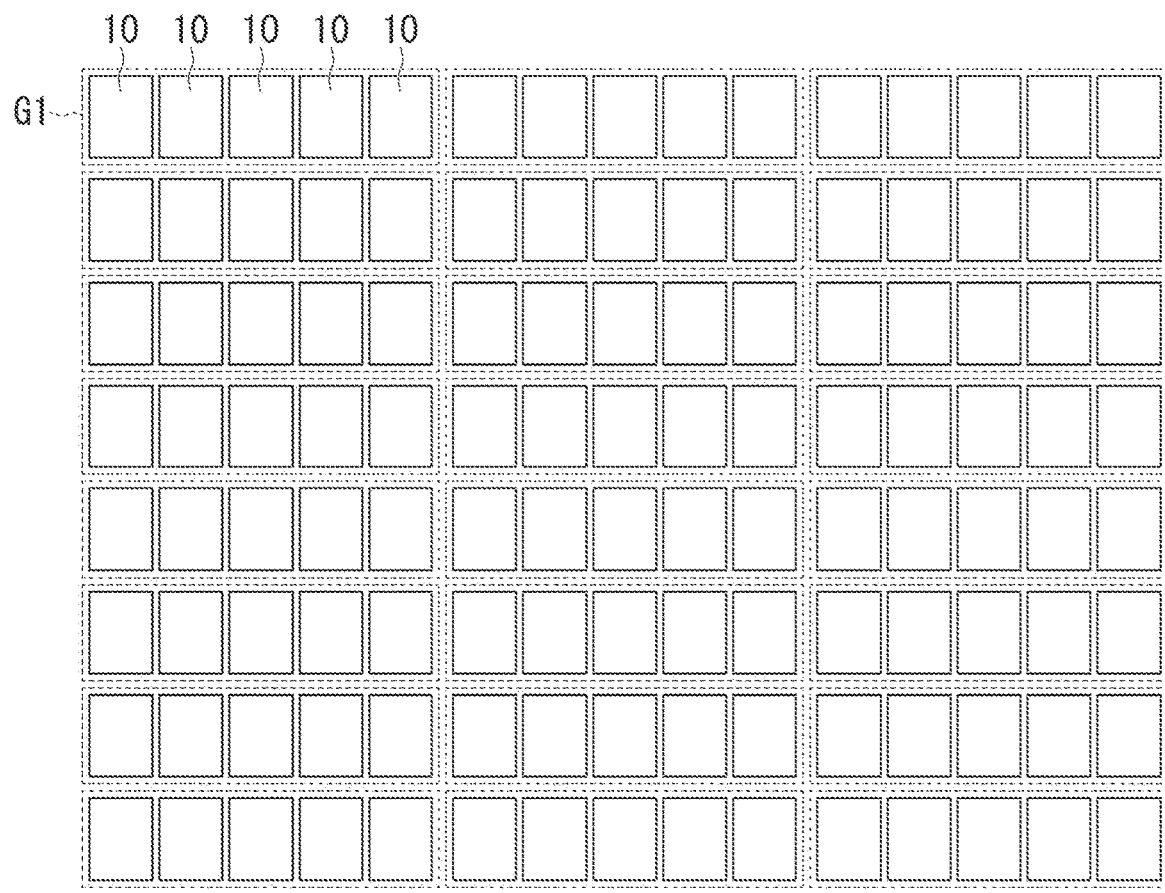
FIG. 9 is a plan view of the photodetector according to the first embodiment.

In addition, a magnetic elements 10 are included so that the magnetic element 10 can easily detect the reflected light L2 reflected by the object Ob or the transmitted light transmitted through the object Ob without performing precise optical axis adjustment. The magnetic element group G1 may be arranged in a two-dimensional array. FIG. 9 is an example of arrangement of the magnetic elements 10 in the photodetector 2 according to the first embodiment. By arranging the magnetic element groups G1 in a two-dimensional array as shown in FIG. 9, at least one of the magnetic element groups G1 is irradiated with the reflected light 12 reflected by the object Ob or the transmitted light transmitted through the object Ob. The signal processor 4 recognizes the information of the object Ob using the electric signal from the magnetic element group G1 irradiated with the reflected light L2 reflected by the object Ob or the transmitted light transmitted through the object Ob, and output it to the outside.

As described above, the analysis system 200 according to the first embodiment uses the magnetic element 10 to detect the reflected light L2 reflected by the sample Ob by the analysis device 100, and detects the result and the data stored in the information storage device 110. By comparing them and the information of the object Ob, the analysis system 200 can recognizes the information of the object Ob.

Also, the magnetization M11 of the first ferromagnetic layer 11 is more likely to change with irradiation of light as the volume of the first ferromagnetic layer 11 is smaller. In other words, the magnetization M11 of the first ferromagnetic layer 11 is more likely to be tilted or decreased by light irradiation as the volume of the first ferromagnetic layer 11 is smaller. In other words, if the volume of the first ferromagnetic layer 11 is reduced, even a small amount of light can change the magnetization M11.

More precisely, the changeability of the magnetization M11 is determined by the product (KuV) of the magnetic anisotropy (Ku) and the volume (V) of the first ferromagnetic layer 11. The magnetization M11 changes with a smaller amount of light as KuV decreases, and the magnetization M11 does not change with a larger amount of light as KuV increases. In other words, the KuV of the first ferromagnetic layer 11 is designed according to the amount of light applied from the outside used in the application. Assuming the detection of an extremely small amount of light, such as a photon, it is possible to detect such a small amount of light by reducing the KuV of the first ferromagnetic layer 11. Become detection of such a small amount of light is a great advantage since it becomes difficult with conventional pn junction semiconductors when the device size is reduced. That is, in order to reduce KuV, the volume of the first ferromagnetic layer 11 is reduced, that is, the element area is reduced, or the film thickness of the first ferromagnetic layer 11 is reduced, thereby enabling photon detection.

Second Embodiment

Figure 10:
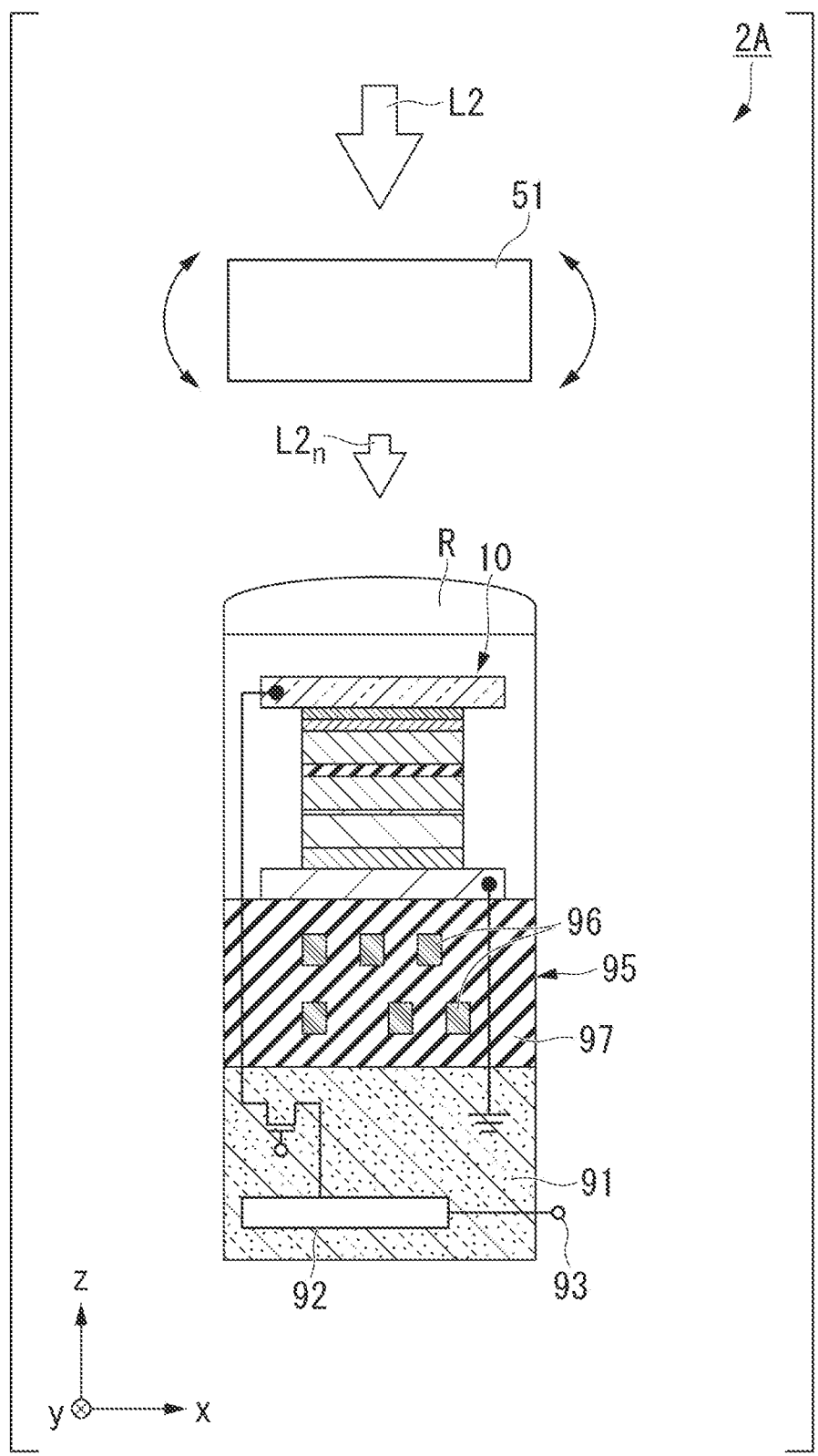
FIG. 10 is a cross-sectional view of a photodetector according to the second embodiment.

The analysis system according to the second embodiment differs from the analysis system 200 according to the first embodiment in the specific configuration of the photodetector. FIG. 10 is a cross-sectional view of a photodetector 2A according to the second embodiment. The photodetector 2A includes the magnetic element 10, the spectrometer 51, the lens R, the circuit board 91 and the wiring layer 95. In the photodetector 2A, the same components as those of the photodetector 2 are denoted by the same reference numerals, and the description thereof is omitted.

The spectrometer 51 disperses the reflected light reflected by the object Ob or transmitted light transmitted through the object Ob. For example, as shown in FIG. 10, the spectrometer 51 disperses the reflected light L2. For example, the reflected light L2 is applied to at least one magnetic element 10 via the spectrometer 51. The number of magnetic elements 10 may be one or more. When the number of magnetic elements 10 is more than one, the magnetic elements 10 may be arranged in a two-dimensional array as in the case of FIG. 9. The spectrometer 51 can change the tilt angle with respect to the xy plane. The spectrometer 51 is rotatable around, for example, any direction of the xy plane. The wavelength of the light $L2_n$ with which the magnetic element 10 is irradiated changes according to the tilt angle of the spectrometer 51 with respect to the xy plane. The light $L2_1$ is a part of the reflected light L2 dispersed by the spectrometer 51.

For example, the reflected light L2 applied to the photodetector 2A is dispersed into light $L2_n$ having specific wavelengths by the spectrometer 51. For example, the split light L2$_n$ is applied to the magnetic element 10. For example, the wavelength of the light L2$_n$ with which the magnetic element 10 is irradiated can be changed by changing the tilt angle of the spectrometer 51.

For example, when the magnetic element 10 is irradiated with the light L2$_n$, the magnetic element 10 generates an output voltage. That is, the magnetic element 10 converts the irradiated light with an electrical signal. For example, when the magnetic element 10 is irradiated with the light L2$_n$ while changing the tilt angle of the spectroscope 51, the magnetic element 10 is irradiated with light of different wavelengths according to the tilt angle of the spectroscope 51. The magnetic element 10 outputs an output voltage corresponding to the intensity of the light L2$_n$ for each wavelength of the irradiated light L2$_n$.

The photodetector 2A generates the signal S1 corresponding to the intensity of the light L2$_n$ according to the output voltage from the magnetic element 10. The signal S1 is an output voltage from the magnetic element 10, and changes, for example, when the intensity of the light L2$_n$ with which the magnetic element 10 is irradiated changes for each wavelength. The signal processor 4 stores the signal S1 in the memory for each wavelength of the light L2$_n$ with which the magnetic element 10 is irradiated. The signal processor 4 compares the data of the reflected light L2 based on the stored signal S1 and the data stored in the information storage device 110. The data stored in the information storage device 110 is, for example, pre-sampled dictionary data. Based on the collation result of the two data, the signal processor 4 recognizes the information of the object Ob and outputs it to the outside.

In order to make it easier for the magnetic element 10 to detect the reflected light L2 reflected by the object Ob or the transmitted light transmitted through the object Ob without performing precise optical axis adjustment, the magnetic elements 10 may be arranged in a two-dimensional array. By arranging them in a two-dimensional array in the photodetector 2A, at least one of the magnetic elements 10 is irradiated with the reflected light L2 reflected by the object Ob or the transmitted light transmitted through the object Ob without precise optical axis adjustment. The signal processor 4 recognizes the information of the sample Ob using the electric signal from the magnetic element 10 irradiated with the reflected light L2 reflected by the sample Ob or the transmitted light transmitted through the sample Ob, and output it to the outside.

In the analysis system according to the second embodiment, the analysis device detects the reflected light L2 reflected by the sample Ob by the magnetic element 10, and compares the result and the data stored in the information storage device 110, and the information of the object Ob can be recognized.

Third Embodiment

Figure 11:
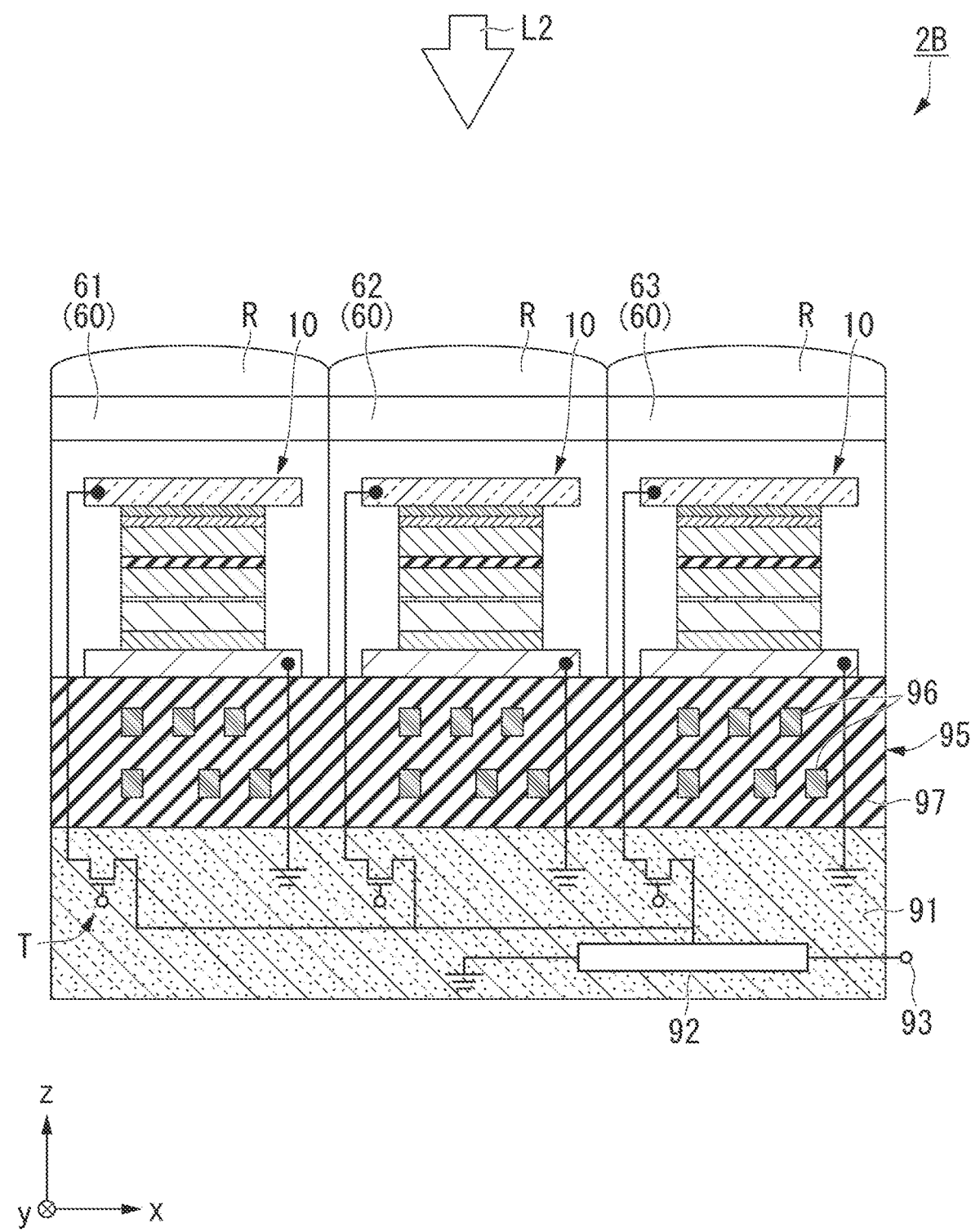
FIG. 11 is a cross-sectional view of a photodetector according to the third embodiment.

The analysis system according to the third embodiment differs from the analysis system 200 according to the first embodiment in the specific configuration of the photodetector. FIG. 11 is a cross-sectional view of a photodetector 2B according to the third embodiment. The photodetector 2B includes the magnetic elements 10, the wavelength filters 60, the lenses R, the circuit board 91 and the wiring layer 95. In the photodetector 2B, the same components as those of the photodetector 2 are denoted by the same reference numerals, and the description thereof is omitted.

There are multiple wavelength filters 60. The wavelength filter 60 transmits light having a specific wavelength band. There are the magnetic elements 10. At least one magnetic element 10 is arranged corresponding to each wavelength filter 60. In the photodetector 2B shown in FIG. 11, one magnetic element 10 is arranged below one wavelength filter 60, but the magnetic elements 10 may be arranged below one wavelength filter 60. The magnetic elements 10 are irradiated with light that has passed through the wavelength filters 60. The reflected light L2 passes through each of the wavelength filters 60 and is applied to at least one magnetic element 10 arranged corresponding to each of the wavelength filters 60. The wavelength filter 60 is, for example, a dielectric multilayer film. At least one of the magnetic elements 10 may have a different element configuration from the other magnetic elements 10. The magnetic elements 10 may have the same element configuration.

At least one of the multiple wavelength filters 60 has a different transmission wavelength band from that of the other wavelength filters 60. The photodetector 2B shown in FIG. 11 has three wavelength filters 61, 62, and 63 as the wavelength filter 60. For example, the wavelength filters 61, 62, and 63 have different transmission wavelength bands. The photodetector 2B shown in FIG. 11 has three wavelength filters 61, 62, and 63 as the wavelength filter 60. The number of wavelength filters with different transmission wavelength bands and the transmission wavelength bandwidth of each wavelength filter may be set in accordance with data of the reflected light reflected by the sample Ob or the transmitted light transmitted through the sample Ob intended to be detected. For example, in the case of Raman spectroscopic analysis, the number of wavelength filters and the transmission wavelength bandwidth sufficient to detect the Raman spectrum of the reflected light reflected by the object Ob or the transmitted light transmitted through the object Ob are provided in the photodetector 2B. For example, in the case of Raman spectroscopic analysis using the light source 1 that emits a laser beam with a wavelength of 785 nm, the photodetector 2B has a transmission wavelength band within a wavelength range of 785 nm to less than 1185 nm, and the transmission wavelength band is 80 wavelength filters each having a transmission wavelength band of 5 nm and different central wavelengths of the transmission wavelength band by 5 nm may be provided.

The reflected light L2 applied to the photodetector 2B passes through the wavelength filters 60 and is applied to each of the magnetic elements 10. Since the wavelength filters 60 transmit only light in specific wavelength bands, each magnetic element 10 is irradiated with the light in a wavelength band corresponding to each of the transmission wavelength bands of the wavelength filters 60.

When the magnetic element 10 is irradiated with a part of the reflected light L2, the magnetic element 10 generates an output voltage. When each magnetic element 10 is irradiated with the light in the wavelength band corresponding to the transmission wavelength band of the wavelength filter 60, an output voltage is generated from each magnetic element. Each magnetic element 10 outputs an output voltage corresponding to the intensity of the light applied to the magnetic element 10 for each wavelength band of the applied light.

The photodetector 2B generates the signal S1 corresponding to the intensity of light with which the magnetic element 10 is irradiated according to the output voltage from the magnetic element 10. The signal S1 is the output voltage from each magnetic element 10. The signal processor 4 stores the signal S1 in the memory for each wavelength band of light with which the magnetic element 10 is irradiated.

The signal processor 4 compares the data of the reflected light L2 based on the stored signal S1 and the data stored in the information storage device 110. The data stored in the information storage device 110 is, for example, pre-sampled dictionary data. Based on the collation result of the two data, the signal processor 4 recognizes the information of the object Ob and outputs it to the outside.

Figure 12:
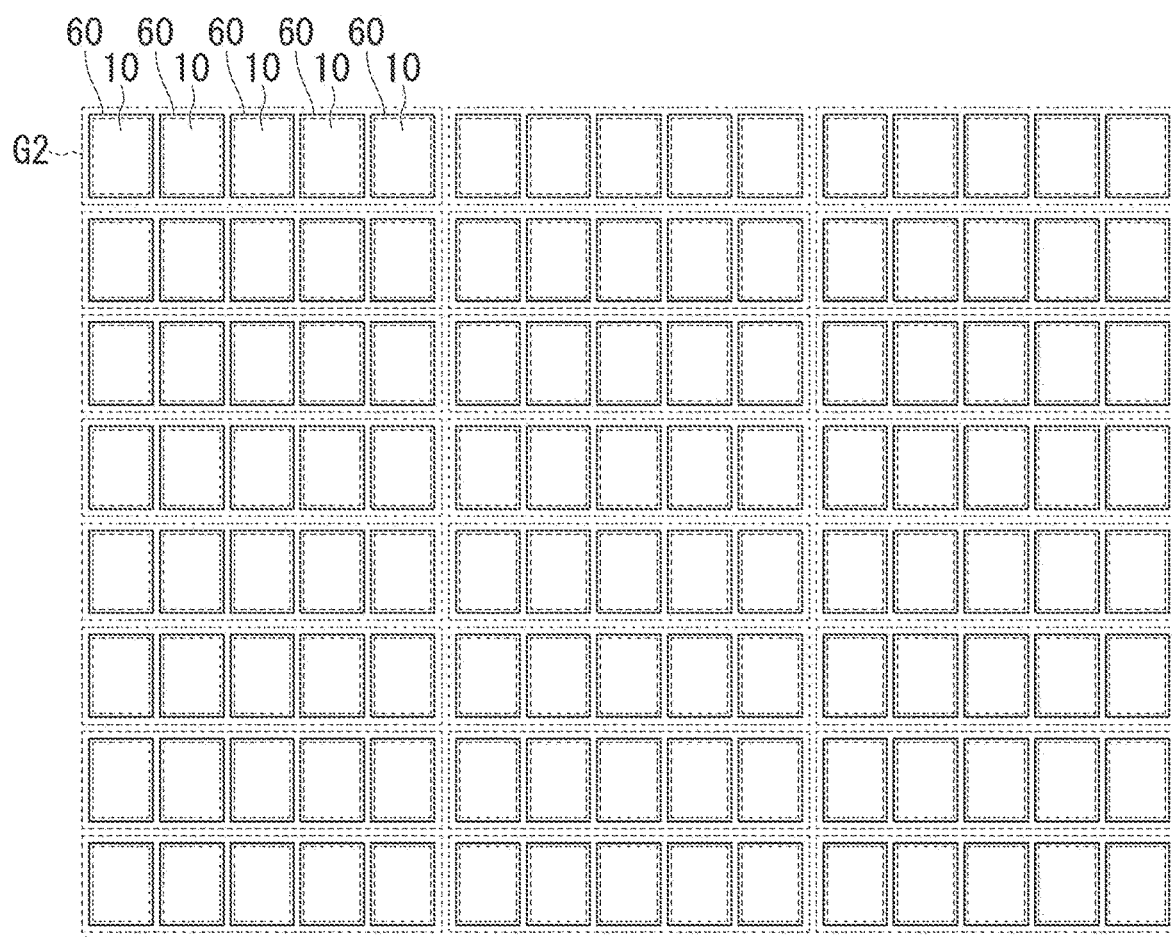
FIG. 12 is a plan view of a photodetector according to the third embodiment.

In order to make it easier for the magnetic element 10 to detect the reflected light L2 reflected by the object Ob or the transmitted light transmitted through the object Ob without performing precise optical axis adjustment, the magnetic elements 10 and the magnetic element groups G2 including the wavelength filters 60 may be arranged in a two-dimensional array. FIG. 12 is an example of arrangement of the magnetic elements 10 and the wavelength filters 60 in the photodetector 2B according to the third embodiment. As shown in FIG. 12, by arranging the magnetic element groups G2 in a two-dimensional array, at least one of the magnetic element groups G2 is irradiated with the reflected light L2 reflected by the object Ob or the transmitted light transmitted through the object Ob without precise optical axis adjustment. The signal processor 4 recognizes the information of the object Ob using the electric signal from the magnetic element group G2 irradiated with the reflected light L2 reflected by the object Ob or the transmitted light transmitted through the object Ob, and output it to the outside.

In the analysis system according to the third embodiment, the analysis device detects the reflected light L2 reflected by the object Ob by the magnetic elements 10, and compares the result and the data stored in the information storage device 110, and information of the object Ob can be recognized. Further, since the photodetector 2B according to the third embodiment does not need to include the spectrometer 50 described in the first embodiment, it can be made more compact.

Fourth Embodiment

Figure 13:
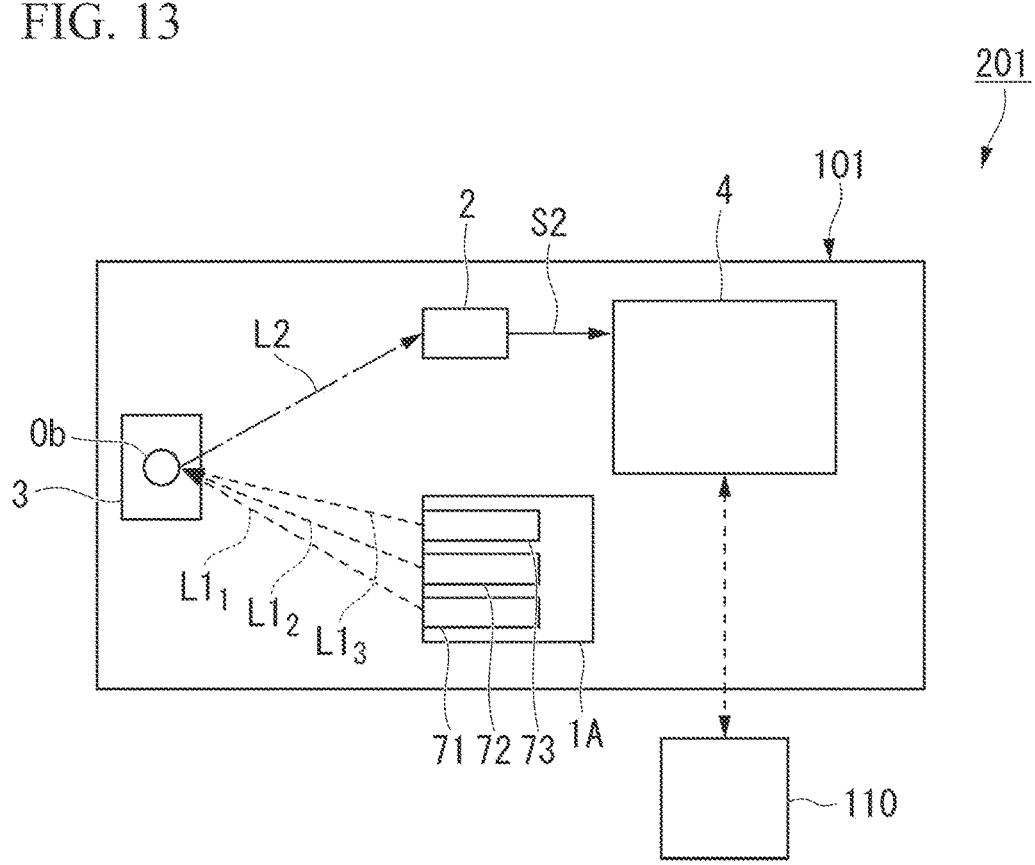
FIG. 13 is a block diagram of the analysis system according to the fourth embodiment.

FIG. 13 is a block diagram of the analysis system 201 according to the fourth embodiment. In the analysis system 201, the same components as in the analysis system 200 are denoted by the same reference numerals, and the description thereof is omitted.

The analysis system 201 comprises the analysis device 101 and the information storage device 110. The analysis device 101 includes, for example, the light source 1A, the photodetector 2, the sample setting part 3, and the signal processor 4.

The light source 1A has the laser elements 71, 72, 73 that emit laser light. The number of laser elements 71, 72, 73 is not limited. At least one of the laser elements 71, 72, 73 emits laser light having a wavelength different from that of the other laser elements. Each of the laser elements 71, 72, 73 emits light with a wavelength of, for example, 300 nm or more and 2000 nm or less.

Lights $L1_1$, $L1_2$, and $L1_3$ are emitted from the laser elements 71, 72, and 73 of the light source 1A, respectively. For example, the lights $L1_1$, $L1_2$, and $L1_3$ have different wavelengths. Some of the lights $L1_1$, $L1_2$, and $L1_3$ are applied to the object Ob and reflected by the object Ob. The photodetector 2 is irradiated with the reflected light L2 reflected by the object Ob. The photodetector device 2 may be replaced with the photodetector devices 2A and 2B described above.

The photodetector 2 is irradiated with reflected light L2 obtained by reflecting each of the lights $L1_1$, $L1_2$, and $L1_3$ of different wavelengths from the object Ob. The reflected light of each of the lights $L1_1$, $L1_2$, and $L1_3$ is dispersed into, for example, wavelengths by the spectrometer 50, and the magnetic element 10 is irradiated with the dispersed light. The analysis device 101 detects the reflected light reflected by the object Ob or the transmitted light transmitted through the object Ob by the magnetic element 10.

In the analysis system according to the fourth embodiment, the analysis device 101 detects the reflected light L2 reflected by the object Ob with the magnetic element 10, and the result is compared with the data stored in the information storage device 110 and the information of the object Ob can be recognized. Further, by emitting light of a wavelengths from the light source 1A, it is possible to recognize more detailed information on the object Ob.

Fifth Embodiment

Figure 14:
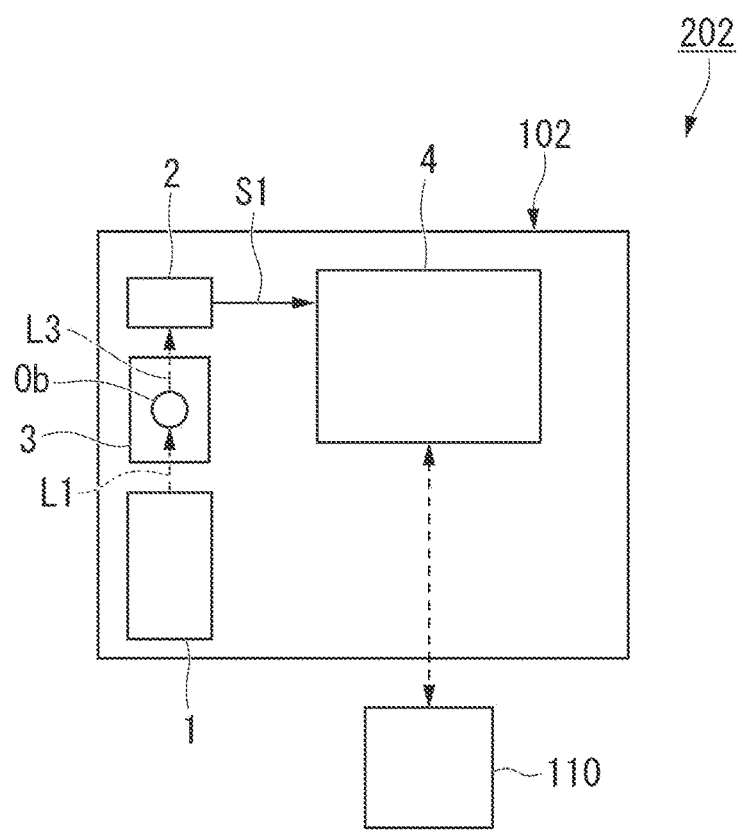
FIG. 14 is a block diagram of the analysis system according to the fifth embodiment.

FIG. 14 is a block diagram of an analysis system 202 according to the fifth embodiment. In the analysis system 202, the same components as in the analysis system 200 are denoted by the same reference numerals, and the description thereof is omitted.

Analysis system 202 includes analysis device 102 and information storage device 110. The analysis device 102 includes, for example, the light source 1, the photodetector 2, the sample setting part 3, and the signal processor 4. The photodetector 2 is irradiated with the transmitted light L3 that has transmitted through the object Ob placed on the sample setting part 3. The magnetic element 10 of the photodetector 2 detects transmitted light that has transmitted through the object Ob. The photodetector device 2 may be replaced with the photodetector devices 2A and 2B described above. Also, the light source 1 may be replaced with the light source TA.

When the object Ob is irradiated with the light L1, a part of the light transmits through the object Ob as transmitted light L3. The transmitted light 13 is applied to the photodetector 2. For example, the transmitted light L3 applied to the photodetector 2 is applied to at least one magnetic element 10 via the spectrometer 50. In the case of the photodetector 2B, the transmitted light L3 applied to the photodetector 2 transmits through, for example, each of the wavelength filters 60 and transmits through at least one magnetic element 10 arranged corresponding to each of the wavelength filters 60. The magnetic element 10 converts the irradiated light into an electrical signal. The photodetector 2 generates the signal S2 corresponding to the intensity of the light with which the magnetic element 10 is irradiated and sends it to the signal processor 4.

The signal processor 4 monitors the signal S2 and stores it in the memory. The signal processor 4 compares the data of the transmitted light L3 based on the stored signal S2 and the data stored in the information storage device 110. Based on the collation result of the two data, the signal processor 4 recognizes the information of the object Ob and outputs it to the outside.

In the analysis system according to the fifth embodiment, the analysis device 102 detects the transmitted light L3 transmitted through the object Ob by the magnetic element 10, and the result is compared with the data stored in the information storage device 110, and the information of the sample Ob can be recognized.

Sixth Embodiment

Figure 15:
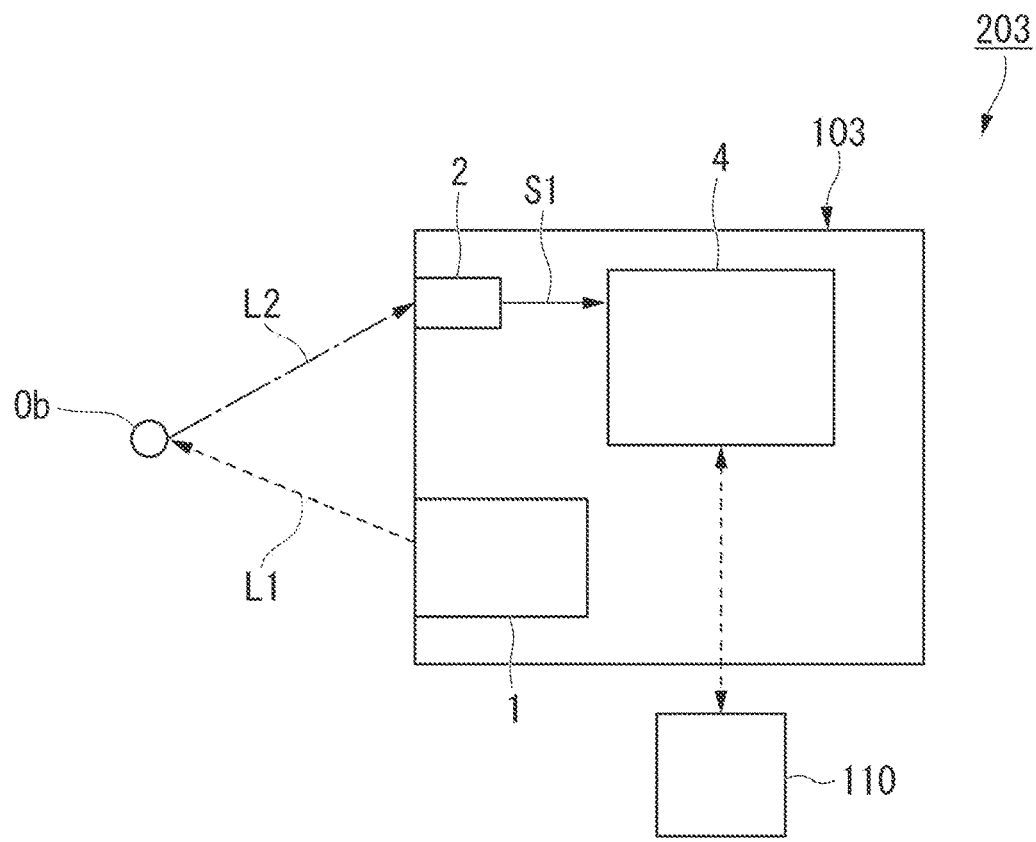
FIG. 15 is a block diagram of an analysis system according to a sixth embodiment.

FIG. 15 is a block diagram of the analysis system 203 according to the sixth embodiment. In the analysis system 203, the same components as those of the analysis system 200 are denoted by the same reference numerals, and the description thereof is omitted.

Analysis system 203 comprises the analysis device 103 and the information storage device 110. The analysis device 103 includes, for example, the light source 1, the photodetector 2, and the signal processor 4. The photodetector device 2 may be replaced with the photodetector devices 2A and 2B described above. Also, the light source 1 may be replaced with the light source 1A. FIG. 15 shows an example in which the reflected light L2 reflected by the object Ob is applied to the photodetector 2. However, as in FIG. 14, the photodetector 2 may be irradiated with the transmitted light L3 that has transmitted through the object Ob.

In the analysis system 203 according to the sixth embodiment, the analysis device 103 detects the reflected light L2 reflected from the object Ob by the magnetic element 10, and compares the result and the data stored in the information storage device 110, and the information of the object Ob can be recognized. The analysis device 103 does not have a sample setting part, and the object Ob is outside the analysis device 103. Therefore, measurement can be performed without being affected by the size or the like of the object Ob.

Figure 16:
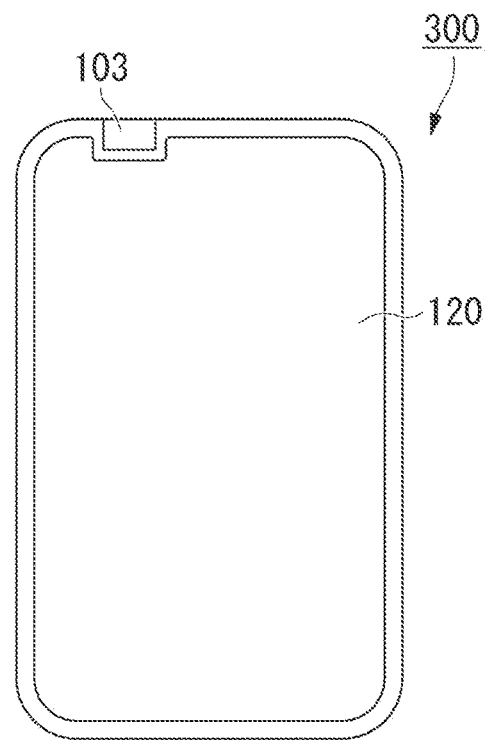
FIG. 16 is a schematic diagram of a portable information terminal using the analysis system according to the sixth embodiment.

FIG. 16 is a schematic diagram of the portable information terminal 300 using the analysis system 203 according to the sixth embodiment. The portable information terminal 300 has the analysis device 103 and the display monitor 120. The analysis system 203 compares: the data of the reflected light L2 reflected by the object Ob detected by the analysis device 103 or the transmitted light L3 transmitted through the object Ob; and the dictionary data stored in the external storage. The collation result is displayed on the display monitor 120 as information of the sample Ob.

The state of the magnetization M11 of the first ferromagnetic layer 11 of the magnetic element 10 changes according to the intensity of the light with a wide range of wavelengths including ultraviolet light, visible light and infrared light. The analysis devices and the analysis system according to the embodiments can be used in a wide range of applications.

As described above, the present disclosure is not limited to the above-described embodiments and modifications, and various modifications and changes are possible within the scope of the present disclosure described in the claims.

While embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

What is claimed is:

1. An analysis device comprising:
a plurality of magnetic elements each having a first ferromagnetic layer, a second ferromagnetic layer, and a spacer layer sandwiched between the first ferromagnetic layer and the second ferromagnetic layer;
a light source configured to emit a light; and
a spectrometer,
wherein the light is applied to an object to be analyzed,
the spectrometer is configured to disperse a reflected light reflected by the object or a transmitted light transmitted through the object towards the plurality of magnetic elements, and
the plurality of magnetic elements are configured to detect the reflected light reflected by the object or the transmitted light transmitted through the object that is dispersed by the spectrometer.

2. The analysis device according to claim 1, further comprising a plurality of wavelength filters, wherein
at least one of the magnetic elements is provided to each of the wavelength filters,
the reflected light or the transmitted light is applied to the at least one of the magnetic elements provided to each of the wavelength filters through each of the wavelength filters, and
at least one of the wavelength filters has a transmission wavelength band different from that of other wavelength filters.

3. The analysis device according to the claim 1, wherein the light source is at least one laser element configured to emit a laser light.

4. The analysis device according to claim 3, wherein the at least one laser element is one of a plurality of laser elements each configured to emit a light,
at least of one of the laser elements is configured to emit a laser light having a wavelength different from that of other laser elements.

5. The analysis device according to claim 3, wherein the at least one laser element is configured to emit a light having a wavelength of 300 nm or more and 2000 nm or less.

6. An analysis system comprising:
the analysis device according to claim 1; and
an information storage device, wherein
the analysis system configured to recognize information of the object by comparing: a data of the reflected light or the transmitted light that the analysis device detects with the plurality of magnetic elements; and a data stored in the information storage device.

7. A portable information terminal comprising:
the analysis system according to the claim 6; and
a display monitor configured to display the information of the object.

8. The analysis device according to claim 1, further comprising a lens connected to each of the plurality of magnetic elements, each lens being configured to converge the light towards a corresponding magnetic element.

* * * * *